(12) United States Patent
Kernene

(10) Patent No.: US 12,013,085 B2
(45) Date of Patent: *Jun. 18, 2024

(54) GAS STORAGE DEVICE

(71) Applicant: Twisted Sun Innovations, Inc., St. Charles, IL (US)

(72) Inventor: Nicolas Kernene, St. Charles, IL (US)

(73) Assignee: Twisted Sun Innovations, Inc., St. Charles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,538

(22) Filed: Sep. 26, 2022

(65) Prior Publication Data

US 2023/0028373 A1 Jan. 26, 2023

Related U.S. Application Data

(63) Continuation of application No. 15/809,282, filed on Nov. 10, 2017, now Pat. No. 11,454,350, which is a
(Continued)

(51) Int. Cl.
*F17C 11/00* (2006.01)
*B32B 1/00* (2006.01)
(Continued)

(52) U.S. Cl.
CPC .............. *F17C 11/005* (2013.01); *B32B 1/00* (2013.01); *B32B 1/08* (2013.01);
(Continued)

(58) Field of Classification Search
CPC .. F17C 5/04; F17C 11/005; F17C 3/00; F17C 6/00; F17C 2221/012; F17C 2201/0119;
(Continued)

(56) References Cited

U.S. PATENT DOCUMENTS

| 4,185,979 A | 1/1980 | Woolley |
| 4,446,111 A | 5/1984 | Halene et al. |

(Continued)

FOREIGN PATENT DOCUMENTS

| DE | 4201131 A1 | 7/1992 |
| EP | 0202172 A1 | 11/1986 |

(Continued)

OTHER PUBLICATIONS

Search Report issued by the International Searching Authority dated Jun. 8, 2012 in connection with corresponding PCT application No. PCT/US2012/026950.

(Continued)

*Primary Examiner* — Robert J Hicks

(74) *Attorney, Agent, or Firm* — King & Spalding LLP

(57) ABSTRACT

The present invention provides a gas storage device. In an embodiment, the gas storage device includes a cylinder with opposing ends. An endcap is present at each end. The cylinder and the endcaps form an enclosure. Each endcap includes a connector. A diaphragm is located in the enclosure. The diaphragm includes an annular sidewall. The device includes an inner chamber defined by an inner surface of the sidewall, and a storage space between an interior surface of the cylinder and an outer surface of the sidewall. A metal hydride composition is located in the storage space.

20 Claims, 19 Drawing Sheets

Related U.S. Application Data continuation of application No. 15/161,800, filed on May 23, 2016, now Pat. No. 9,841,147.

(51) Int. Cl.
  *B32B 1/08* (2006.01)
  *B60K 15/03* (2006.01)
  *F17C 3/00* (2006.01)
  *F17C 6/00* (2006.01)
  *H01M 8/04* (2016.01)
  *H01M 8/04089* (2016.01)

(52) U.S. Cl.
  CPC .......... *B60K 15/03006* (2013.01); *F17C 3/00* (2013.01); *F17C 6/00* (2013.01); *H01M 8/04089* (2013.01); *B60K 2015/03164* (2013.01); *B60K 2015/03315* (2013.01); *F17C 2201/0119* (2013.01); *F17C 2227/0302* (2013.01); *F17C 2227/0337* (2013.01); *H01M 2250/20* (2013.01); *Y02T 90/40* (2013.01); *Y10T 428/13* (2015.01); *Y10T 428/1352* (2015.01); *Y10T 428/1379* (2015.01); *Y10T 428/1386* (2015.01)

(58) Field of Classification Search
  CPC ...... F17C 2201/0104; F17C 2227/0302; F17C 2227/0337; B60K 15/03006; B60K 15/03; B60K 2015/03315; B60K 2015/03309; B60K 2015/03164; B65D 1/40; H01M 8/04089; H01M 2250/20; B32B 1/02; B32B 1/08
  USPC .... 220/62.18, 562, 582, 581, 560.08, 560.1, 220/586; 429/505, 502, 218.2, 200; 206/6
  See application file for complete search history.

(56) References Cited

U.S. PATENT DOCUMENTS

| | | | |
|---|---|---|---|
| 4,667,815 A | 5/1987 | Halene |
| 5,551,991 A | 9/1996 | Avero |
| 5,830,593 A | 11/1998 | Nielson |
| 6,015,041 A | 1/2000 | Heung |
| 6,238,823 B1 | 5/2001 | Reilly et al. |
| 6,708,546 B2 | 3/2004 | Myasnikov et al. |
| 6,969,545 B2 | 11/2005 | Finamore |
| 7,320,726 B2 | 1/2008 | Shih |
| 7,418,782 B2 | 9/2008 | Kimbara et al. |
| 7,478,647 B2 | 1/2009 | Larsen et al. |
| 7,576,660 B2 | 8/2009 | Veenstra |
| 7,947,119 B2 | 5/2011 | Golz et al. |
| 8,646,597 B2 | 2/2014 | Yang et al. |
| 8,852,821 B2 | 10/2014 | Kernene |
| 9,841,147 B1 | 12/2017 | Kernene |
| 11,454,350 B2 | 9/2022 | Kernene |
| 2002/0100836 A1 | 8/2002 | Hunt |
| 2002/0114983 A1 | 8/2002 | Frank et al. |
| 2002/0117123 A1 | 8/2002 | Hussain et al. |
| 2004/0023087 A1 | 2/2004 | Redmond |
| 2004/0224193 A1 | 11/2004 | Mitlitsky |
| 2005/0000970 A1 | 1/2005 | Kimbara |
| 2005/0008918 A1 | 1/2005 | Nakakubo |
| 2005/0166992 A1 | 8/2005 | Yokota et al. |
| 2005/0252548 A1 | 11/2005 | Stetson |
| 2006/0065552 A1 | 3/2006 | Golben |
| 2008/0209918 A1 | 9/2008 | White |
| 2008/0233440 A1 | 9/2008 | Kernene |
| 2008/0277273 A1 | 11/2008 | Logan |
| 2009/0208792 A1 | 8/2009 | Chiu |
| 2009/0263315 A1 | 10/2009 | Mehta |
| 2009/0269624 A1 | 10/2009 | Hwang et al. |
| 2010/0171505 A1 | 7/2010 | Norgaard et al. |
| 2010/0285695 A1 | 11/2010 | Ueno |
| 2011/0294027 A1 | 12/2011 | Kibune et al. |
| 2012/0132545 A1 | 5/2012 | Lee et al. |
| 2012/0160712 A1 | 6/2012 | Yang et al. |
| 2012/0211376 A1 | 8/2012 | Chung et al. |
| 2012/0214088 A1 | 8/2012 | Breuer |
| 2013/0260270 A1 | 10/2013 | Eickhoff |
| 2013/0295482 A1 | 11/2013 | Kim et al. |
| 2014/0072836 A1 | 3/2014 | Mills |
| 2014/0349204 A1 | 11/2014 | Kemene |
| 2014/0360891 A1 | 12/2014 | Kline |
| 2015/0014186 A1 | 1/2015 | Wang et al. |
| 2016/0023897 A1 | 1/2016 | Gu |
| 2017/0336029 A1 | 11/2017 | Kernene |
| 2018/0003345 A1 | 1/2018 | Gillia |
| 2020/0292132 A1 | 9/2020 | Gillia |
| 2020/0346162 A1 | 11/2020 | Fowler |
| 2021/0104764 A1 | 4/2021 | Allo |

FOREIGN PATENT DOCUMENTS

| | | |
|---|---|---|
| GB | 2148478 A | 5/1985 |
| JP | S622929601 A | 12/1987 |
| JP | H1092453 A | 4/1998 |
| JP | 2005009549 A | 1/2005 |
| JP | 2005-282828 A | 10/2005 |
| JP | 2005282828 A | 10/2005 |
| JP | 2006035174 A | 2/2006 |
| JP | 2016528036 A | 9/2016 |
| KR | 10-2004-0012993 A | 2/2004 |

OTHER PUBLICATIONS

Pyle et al., "Solar Hydrogen Production by Electrolysis", Home Power #39, 1994, http://www.dangerouslaboratories.org/h2homesystem.pdf especially pp. 32-34.

International Search Report and Written Opinion for PCT/US2023/006972 dated Dec. 11, 2023.

International Search Report and Written Opinion for PCT/US2023/063859 dated Jul. 10, 2023.

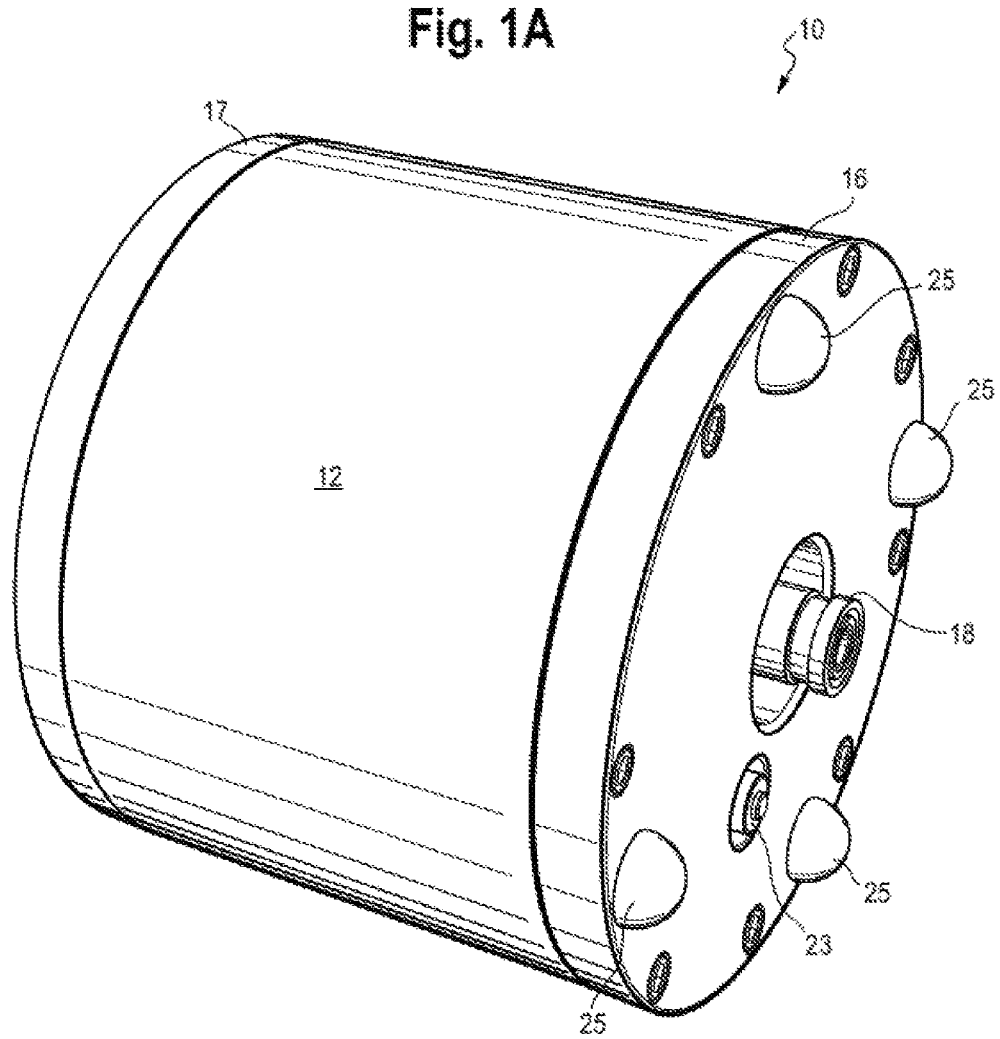

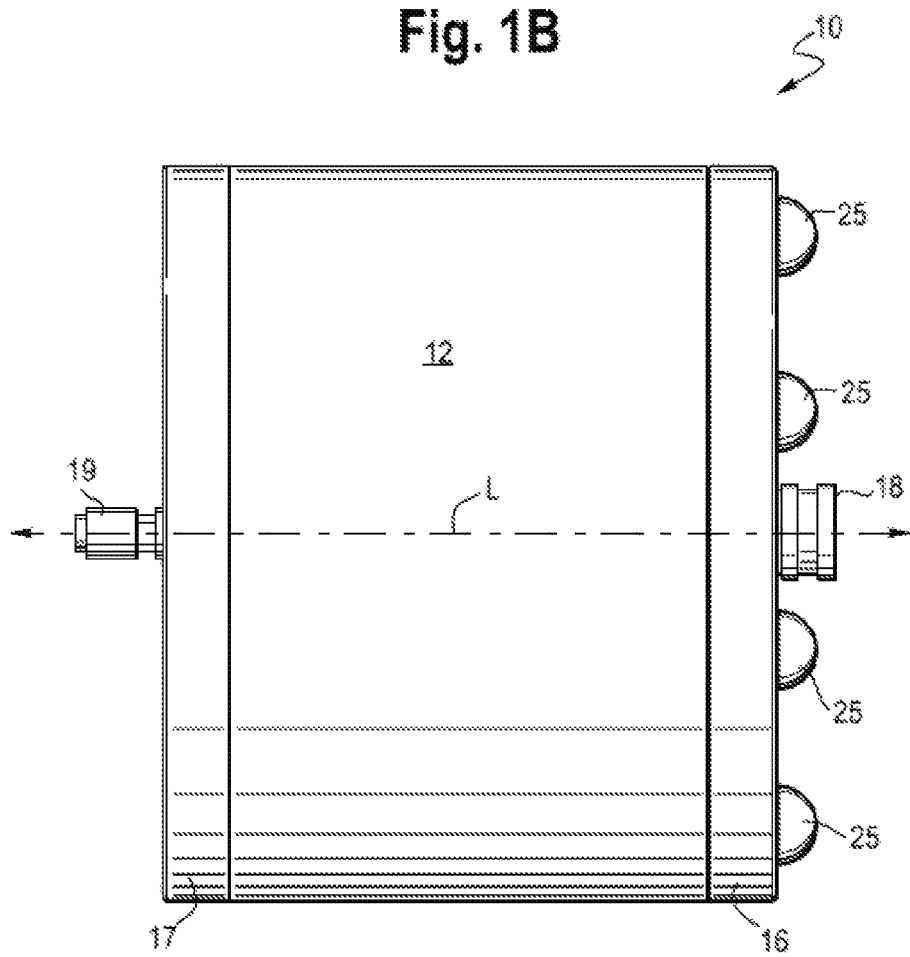

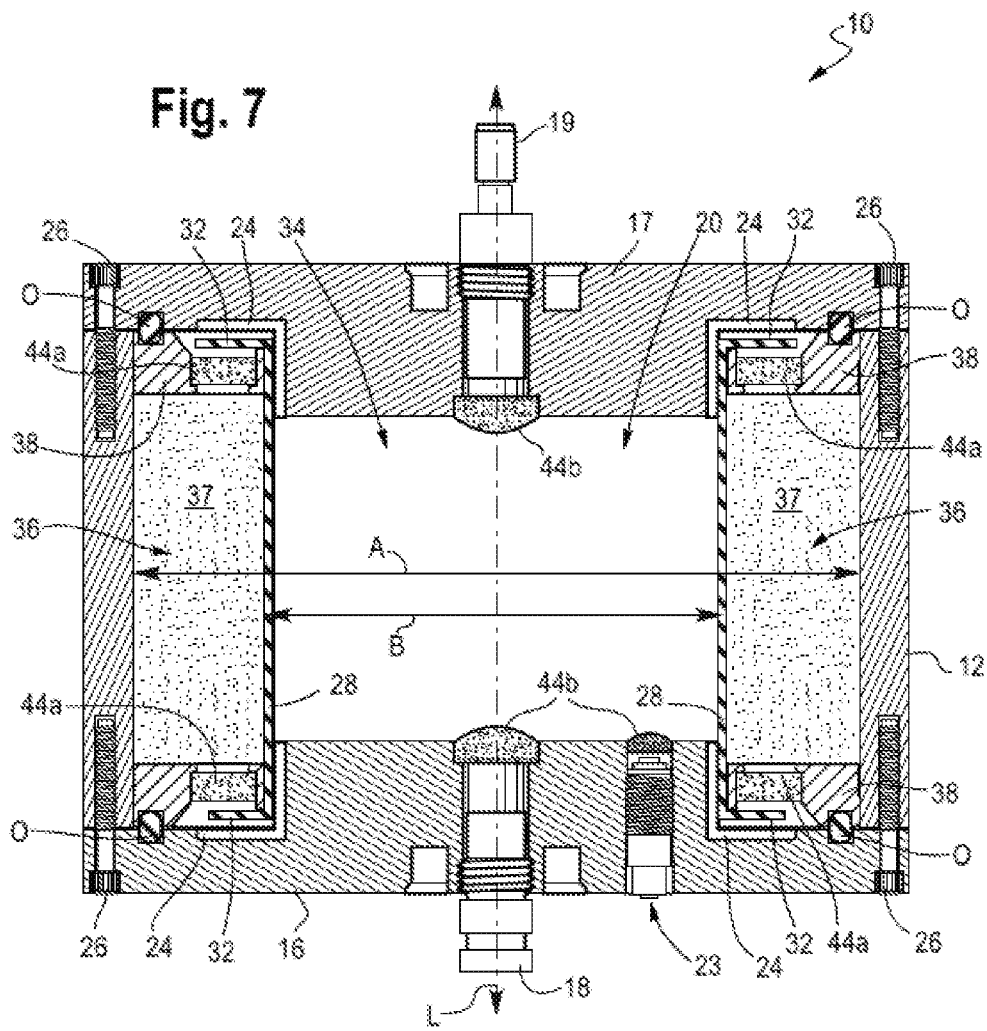

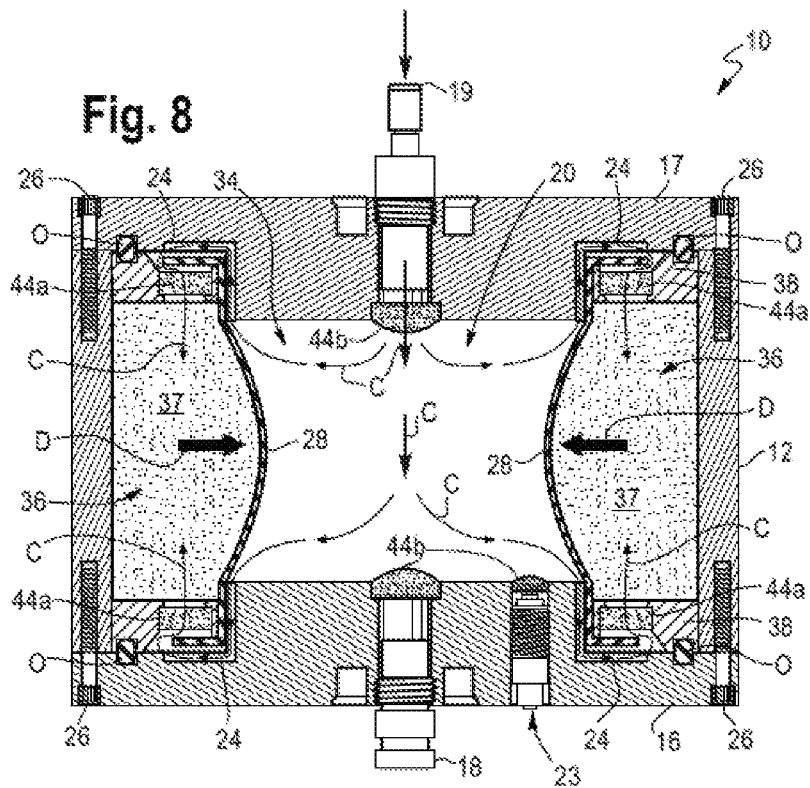
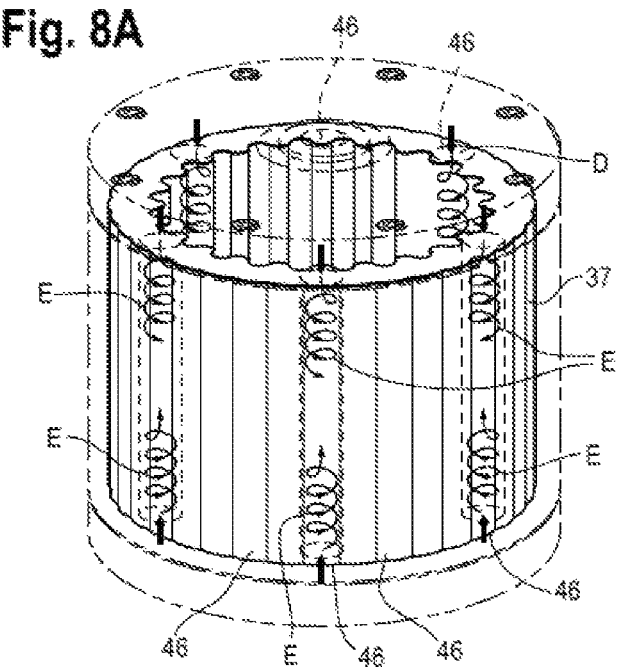

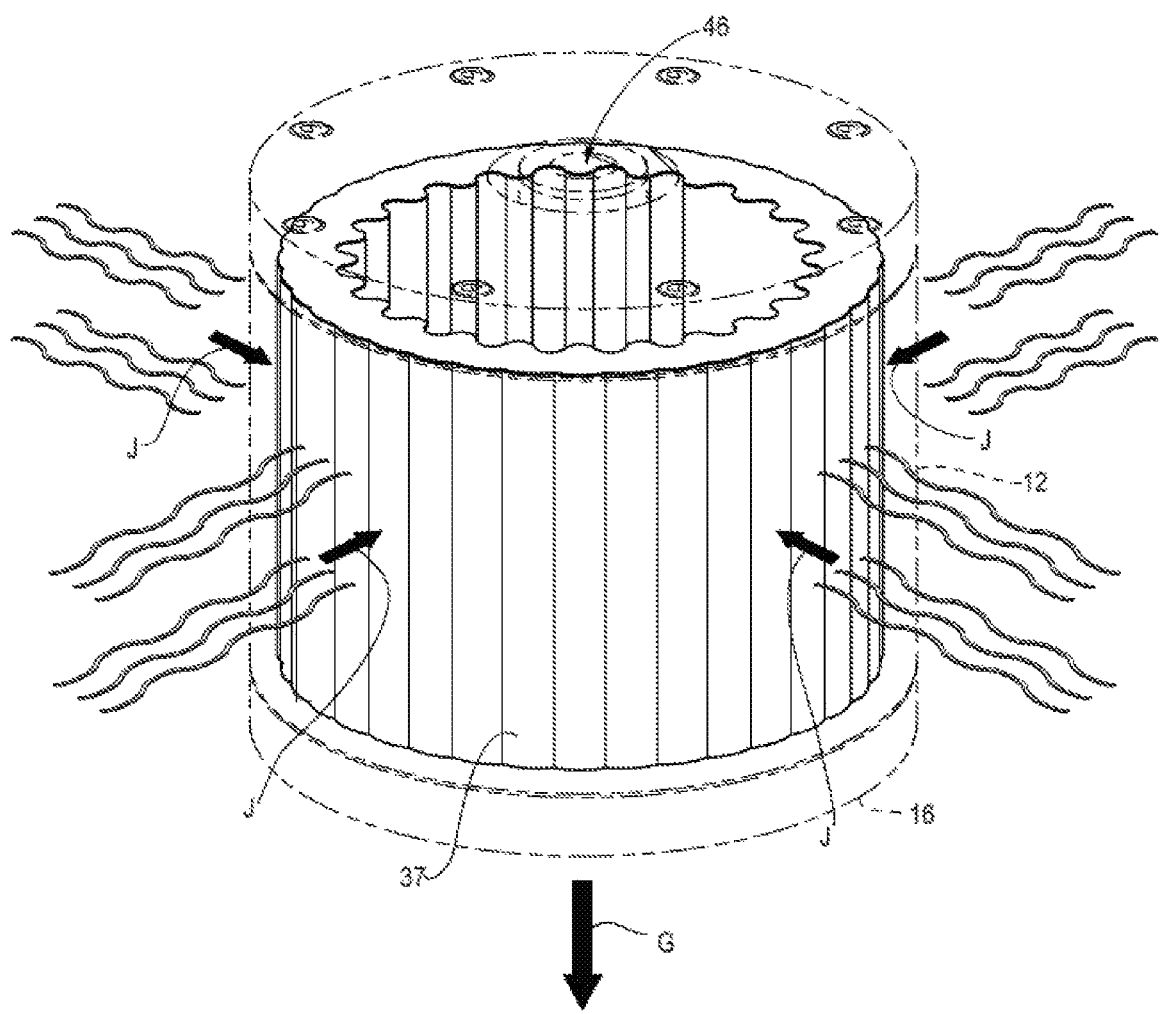

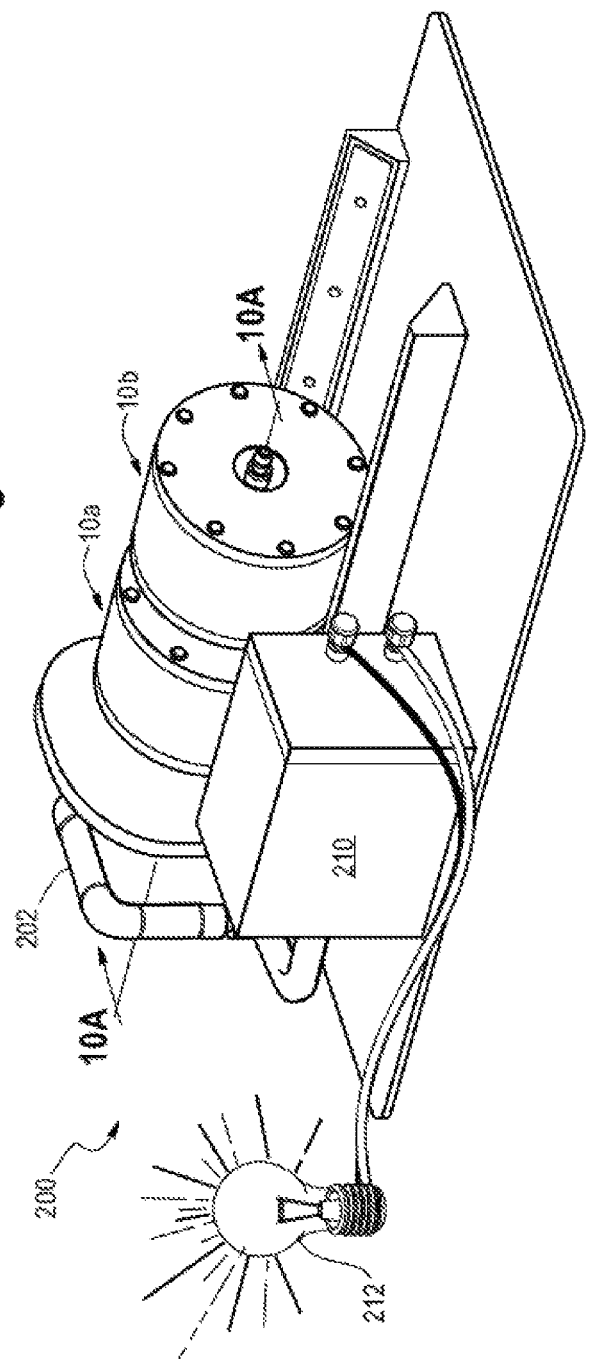

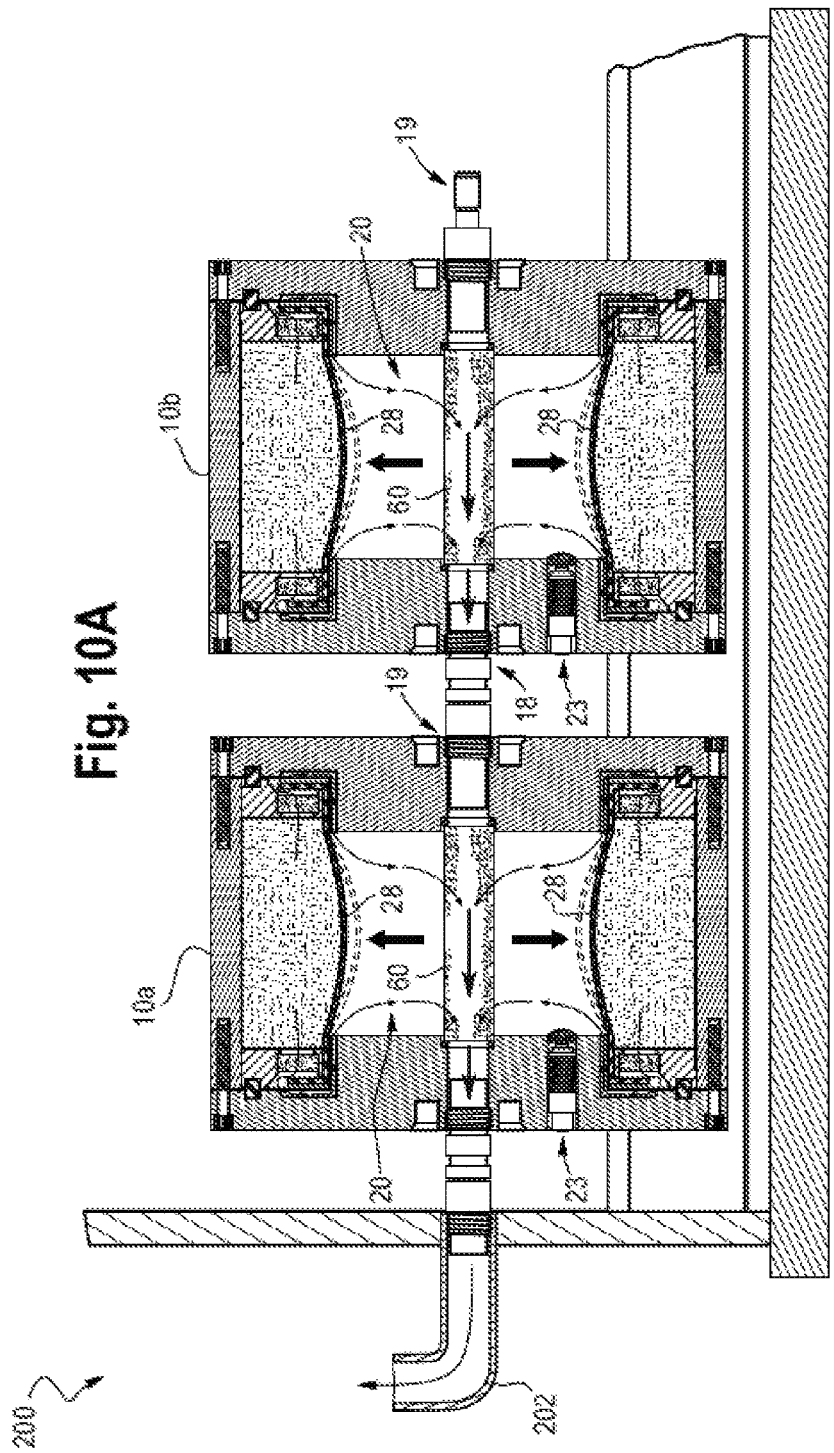

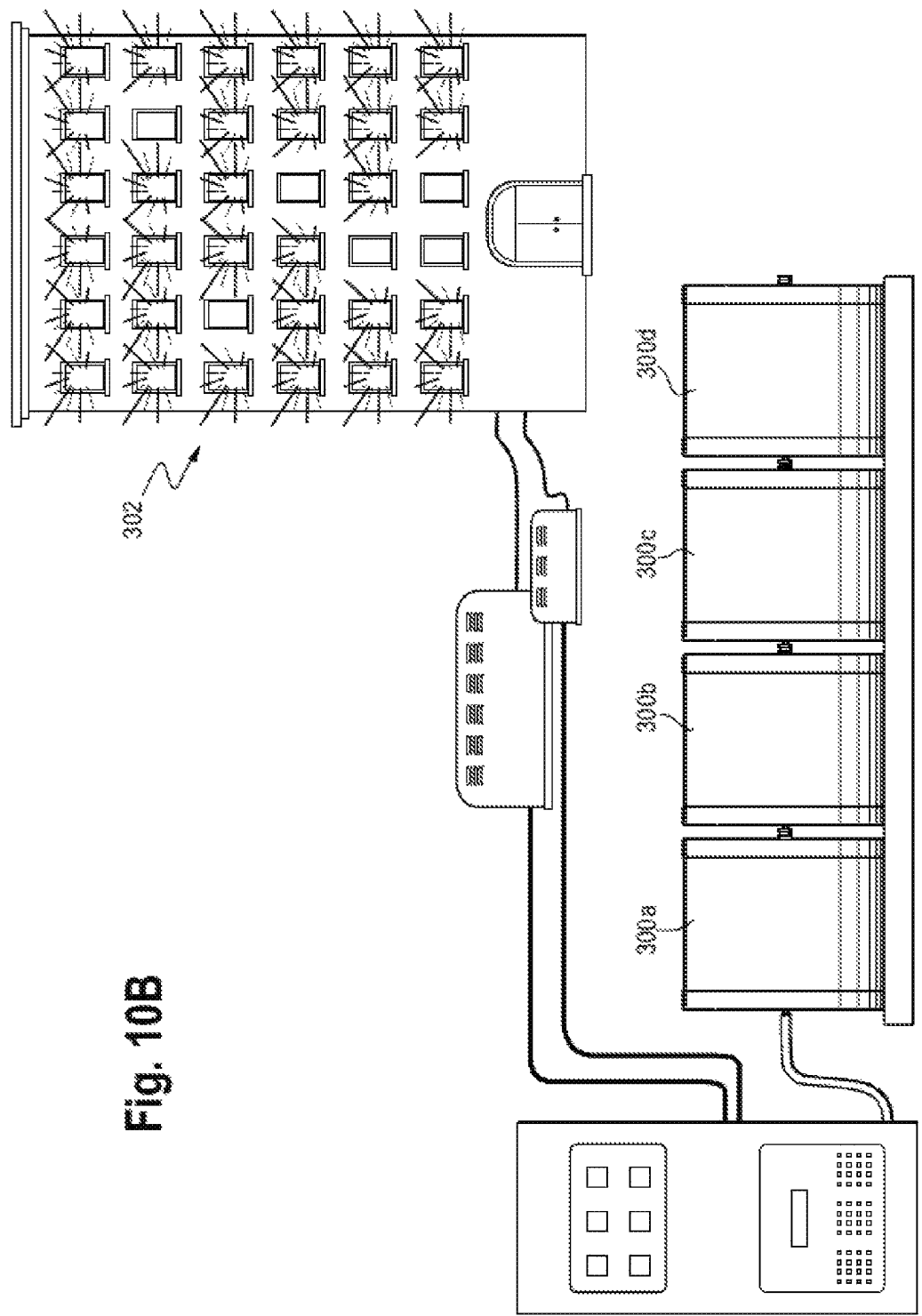

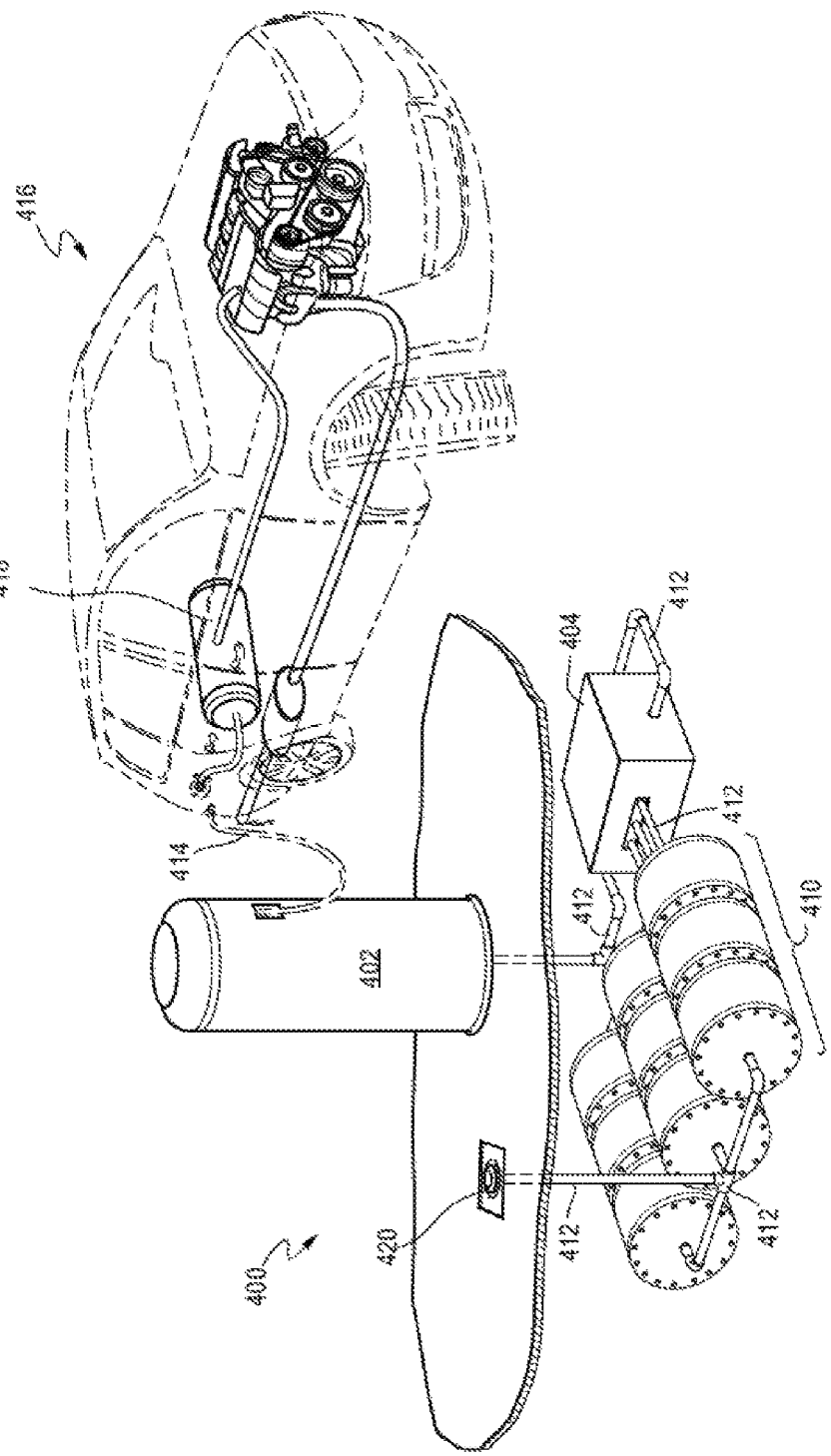

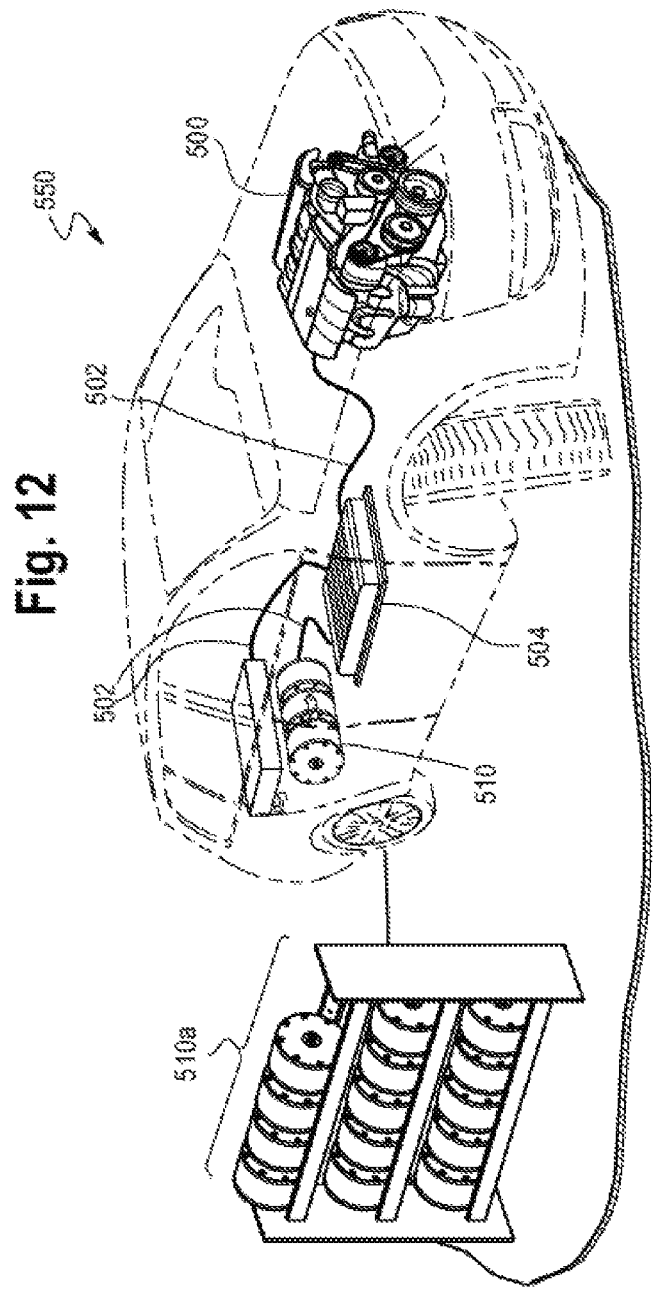

GAS STORAGE DEVICE

RELATED APPLICATIONS

The present application is a continuation application of and claims priority to U.S. patent application Ser. No. 15/809,282 filed Nov. 10, 2017, which is a continuation application of and claims priority to U.S. patent application Ser. No. 15/161,800 filed May 23, 2016 and which issued as U.S. Pat. No. 9,841,147. The entire contents of the foregoing applications are hereby incorporated herein by reference.

BACKGROUND

Hydrogen gas is the object of significant research as an alternate fuel source to fossil fuels. Hydrogen is attractive because (i) it can be produced from many diverse energy sources, (ii) hydrogen has a high energy content by weight (about three times more than gasoline) and (iii) hydrogen's zero-carbon emission footprint—the by-products of hydrogen combustion being oxygen and water.

However, hydrogen has physical characteristics that make it difficult to store in large quantities without taking up a significant amount of space. Despite hydrogen's high energy content by weight, hydrogen has a low energy content by volume. This makes hydrogen difficult to store, particularly within the size and weight constraints of a vehicle, for example. Another major obstacle is hydrogen's flammability and the concomitant safe storage thereof.

Known hydrogen storage technologies directed to high pressure tanks with compressed hydrogen gas and/or cryogenic liquid hydrogen storage have shortcomings because the risk of explosion still exists. These approaches require pressurized containers that are heavy and also require high energy input—features that detract from commercial viability.

Metal alloy hydrogen storage is based on materials capable of reversibly absorbing and releasing the hydrogen. Metal alloy hydrogen storage provides high energy content by volume, reduces the risk of explosion, and eliminates the need for high pressure tanks and insulation devices. Metal alloy hydrogen storage, however, struggles with low energy content by weight.

The art recognizes the need for safe, reliable, compact, and cost-effective hydrogen storage technology. The art further recognizes the need for continued development of metal alloy hydrogen storage.

SUMMARY

The present disclosure provides a gas storage device. In an embodiment, the gas storage device includes a cylinder with opposing ends. An endcap is present at each end. The cylinder and the endcaps form an enclosure. Each endcap includes a connector. A diaphragm is located in the enclosure. The diaphragm includes an annular sidewall. The device includes an inner chamber defined by an inner surface of the sidewall, and a storage space between an interior surface of the cylinder and an outer surface of the sidewall. A metal hydride composition is located in the storage space.

The present disclosure provides a gas storage assembly. In an embodiment, the gas storage assembly includes a first gas storage device and a second gas storage device. Each device includes a cylinder with opposing ends and an endcap at each end. The cylinder and the endcaps form an enclosure. Each endcap includes a connector. A diaphragm is located in the enclosure. The diaphragm includes an annular sidewall. An inner chamber is defined by an inner surface of the sidewall, and a storage space is located between an inner surface of the cylinder and an outer surface of the sidewall. A metal hydride composition is located in each storage space. A connector of the first device is attached to a connector of the second device. The attached connectors provide fluid communication between the enclosure of the first device and the enclosure of the second device.

The present disclosure provides a hydrogen charging station. The hydrogen charging station includes at least one of the present gas storage devices.

The present disclosure provides a hydrogen powered vehicle. The hydrogen powered vehicle includes at least one of the present gas storage devices.

The present disclosure provides a power pack. The power pack includes at least one of the present gas storage devices.

BRIEF DESCRIPTION OF THE DRAWINGS

FIG. 1A is a perspective view of a gas storage device in accordance with an embodiment of the present disclosure.

FIG. 1B is a side elevation view of the gas storage device of FIG. 1.

FIG. 7 is a sectional view of the gas storage device in accordance with an embodiment of the present disclosure.

FIG. 8 is a sectional view of the storage device of FIG. 7 during a gas charging procedure in accordance with an embodiment of the present disclosure.

FIG. 8A is a cutaway perspective view of a metal hydride composition during the gas charging procedure of FIG. 8, in accordance with an embodiment of the present disclosure.

FIG. 9B is another cutaway perspective view of the metal hydride composition during the gas discharging procedure of FIG. 9, in accordance with an embodiment of the present disclosure.

FIG. 10 is a perspective view of two interconnected gas storage devices in accordance with an embodiment of the present disclosure.

FIG. 10A is a sectional view of two interconnected gas storage devices taken along line 10A-10A of FIG. 10.

FIG. 10B is a schematic representation of the gas storage device generating electricity, in accordance with an embodiment of the present disclosure.

FIG. 11 is a perspective view of a hydrogen charging station utilizing the present gas storage device in accordance with an embodiment of the present disclosure.

FIG. 12 is a perspective view of a vehicle powered by the present gas storage device in accordance with an embodiment of the present disclosure.

DEFINITIONS

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as the reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured by performing standard displacement tests for small solids.

Volume is measured in accordance with standard calculus integration in three axes.

DETAILED DESCRIPTION

The present disclosure provides a gas storage device. In an embodiment, the gas storage device includes a cylinder with opposing ends. An endcap is attached to each cylinder end. The cylinder and the endcaps form an enclosure. Each endcap includes a connector. A diaphragm with an annular sidewall is located in the enclosure. The gas storage device includes an inner chamber defined by an inner surface of the sidewall. The device also includes a storage space between an interior surface of the cylinder and an outer surface of the diaphragm sidewall. A metal hydride composition is located in the storage space.

The present device stores a gas. Nonlimiting examples of suitable gasses for storage in the present device include hydrogen, methane, ethane, propane, butane, hythane (hydrogen/methane), and combinations thereof.

In an embodiment, the present device stores hydrogen gas. Although the present disclosure is directed to hydrogen gas storage, it is understood that other gasses may be stored by way of the present device.

1. Cylinder

Figure 2:
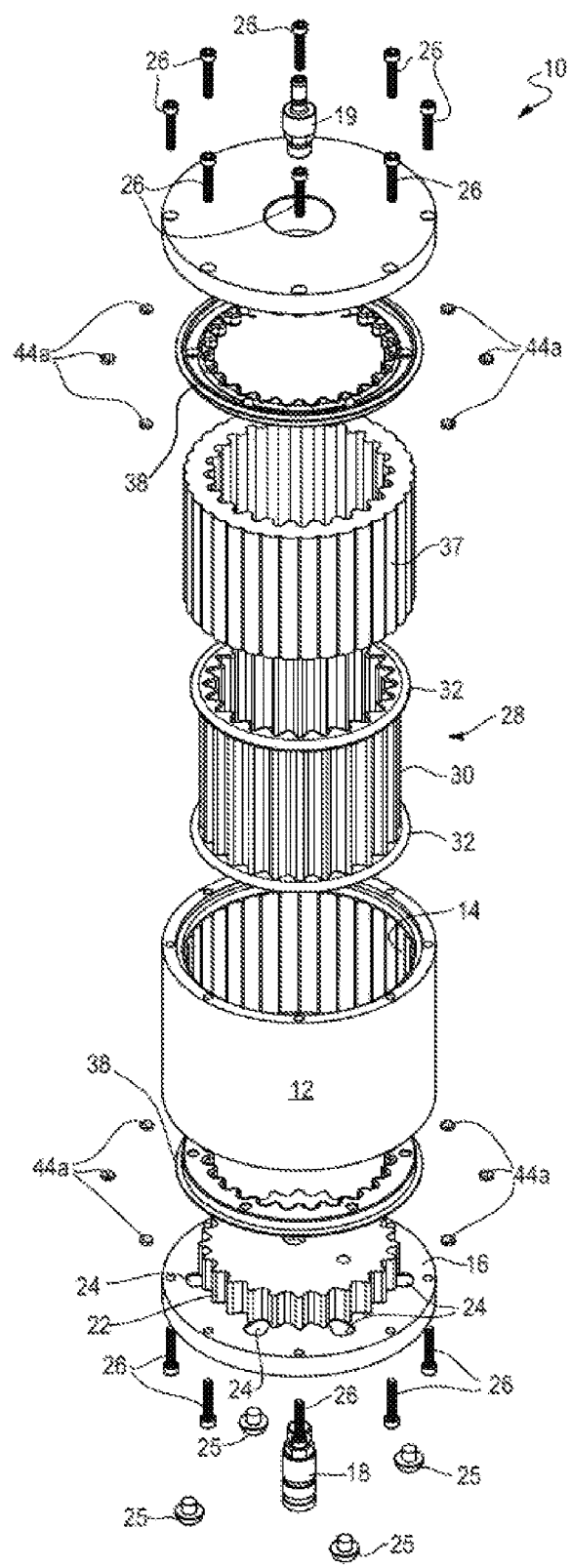
FIG. 2 is an exploded perspective view of the gas storage device in accordance with an embodiment of the present disclosure.

The gas storage device includes a cylinder with opposing ends. In an embodiment, a gas storage device 10 is provided and includes a cylinder 12 as shown in FIGS. 1A, 1B, and 2. The cylinder 12 is an annular structure, or a hollow structure. The cylinder 12 has opposing ends. The cross-sectional shape of the cylinder may be circular, elliptical, or polygonal. The inner diameter of the cylinder may be uniform or the inner diameter of the cylinder may vary along the length of the cylinder.

In an embodiment, the cross-sectional shape of the cylinder 12 is circular, or substantially circular, and the diameter of the cylinder 12 is uniform, or otherwise constant, along its length as shown in FIGS. 1A, 1B, and 2.

Nonlimiting examples of suitable materials for the cylinder include metal, polymeric material, nanomaterials, and combinations thereof. Nonlimiting examples of suitable metal for the cylinder include aluminum, aluminum alloy, copper, steel, stainless steel, and combinations thereof. Nonlimiting examples of suitable polymeric material for the cylinder include carbon fiber, polyolefin, polycarbonate, acrylate, fiberglass, and Ultem, and combinations thereof. The cylinder may be a combination of metal and polymeric material such as a metal liner thermoset in a polymeric resin, for example.

In an embodiment, the cylinder 12 is composed of a heat conductive material. The heat conductive material promotes heat dissipation (cooling) during hydrogen charging and promotes warming during hydrogen discharge as will be described below. In this way, the cylinder body itself functions as a heat exchanger and the present gas storage device eliminates the need for a separate heat exchanger and/or a separate coolant system. The structure and composition of the cylinder 12 advantageously promotes energy efficiency, ease-of-use, ease-of-production, and reduction in weight for the device 10.

In an embodiment, the cylinder 12 is composed of aluminum, a heat conductive material.

In an embodiment, the cylinder 12 is composed of stainless steel, a heat conductive material.

The interior surface of the cylinder 12 can be smooth or fluted. In an embodiment, the cylinder 12 has a fluted interior surface 14 as shown in FIG. 2. The term "fluted" or "fluting," or "fluted surface," and like terms refers to a structure embodying a series of uniform and repeating grooves and peaks. The fluting can be any structure and/or configuration that increases the surface area of the interior surface 12. The low-point of the groove and/or the high point of the peak may be pointed or may be curved. In an embodiment, the low-point and the high-point for respective grooves and peaks for fluted interior surface 14 are curved, each low-point and/or high-point having a radius of curvature, Rc, from 0.1 millimeter (mm), or 0.5 mm, or 1.0 mm, or 1.5 mm, or 2.0 mm, or 4.0 mm, or 5.0 mm, or 6.0 mm, or 7.0 mm, or 8.0 mm, or 10 mm, or 20 mm, or 50 mm, or 70 mm, or 90 mm to 100 mm, or 150 mm, or 200 mm.

In an embodiment, the Rc for the fluting is from 4.0 mm, or 6.0 mm to 7.0 mm, or 8.0 mm.

2. Endcaps

At each end of the cylinder is a respective endcap. At least one endcap is releasably attached to its respective cylinder end, permitting access to the cylinder interior. In an embodiment, one endcap is releasably attachable to one cylinder end and the other endcap is permanently affixed to, or is otherwise integral to, the other cylinder end. The cylinder and the endcaps form an interior enclosure or enclosure 20 shown in FIGS. 7, 8, and 9.

In an embodiment, each endcap is releasably attached to a respective cylinder end. The device 10 includes endcap 16 and an endcap 17 as best shown in FIGS. 1A, 1B, and 2. Each endcap 16, 17 is releasably attachable to the cylinder 12 by way of attachment members. The material of each endcap may be the same or different. The endcap material may be the same as, or different than, the material of the cylinder as previously disclosed.

In an embodiment, the material of each endcap and the material of the cylinder is the same, the cylinder and each endcap composed of a heat conductive material.

Each endcap includes a respective connector. Endcap 16 includes connector 18 and endcap 17 includes connector 19. Each connector 18, 19 is a tubular conduit, each connector including a two-way valve permitting through-flow fluid communication between the enclosure and the external environment. The two-way valve permits gas (i.e., hydrogen gas) to flow into the gas storage device. Each two-way valve also permits hydrogen gas to flow out of the device. A nonlimiting example of a suitable two-way valve for each connector 18, 19 is a quick connect valve with a pullback collar.

In an embodiment, each connector is centrally located on its respective endcap. The connectors 18, 19 define a central longitudinal axis L through the device 10 as shown in FIGS. 1B and 7.

In an embodiment, endcap 16 includes a pressure release valve 23 shown in FIGS. 1A, 3, 3A-3E, 7, 8 and 10A. Pressure release valve 23 allows for escapement of pressure to avoid unsafe buildup of pressure within gas storage device 10 and ensures the safe handling of metal hydride composition and pressurized hydrogen.

In an embodiment, the pressure release valve 23 releases, or otherwise opens, when the pressure within cylinder 12 is greater than or equal to 3447 kiloPascals (kPa) (500 pounds per square inch, psi).

In an embodiment, endcap 16 includes feet 25. Feet 25 protect connector 18 when the device 10 is stood upright, supported by endcap 16. It is understood endcap 17 may have similar feet.

The exterior of each endcap may include a structure, such as a sheath (not shown) to protect each connector 18, 19. The sheath may be integral to the endcap. Alternatively, a sheath may be attached to each respective endcap to protect each connector against impact, drop, or other damage.

Each endcap 16, 17 includes a respective rim located on the interior surface of the endcap. The structure of the rim may be smooth (non-fluted) or may be fluted. The rim provides a continuous inner perimeter on an inner surface of the endcap.

Figure 3:
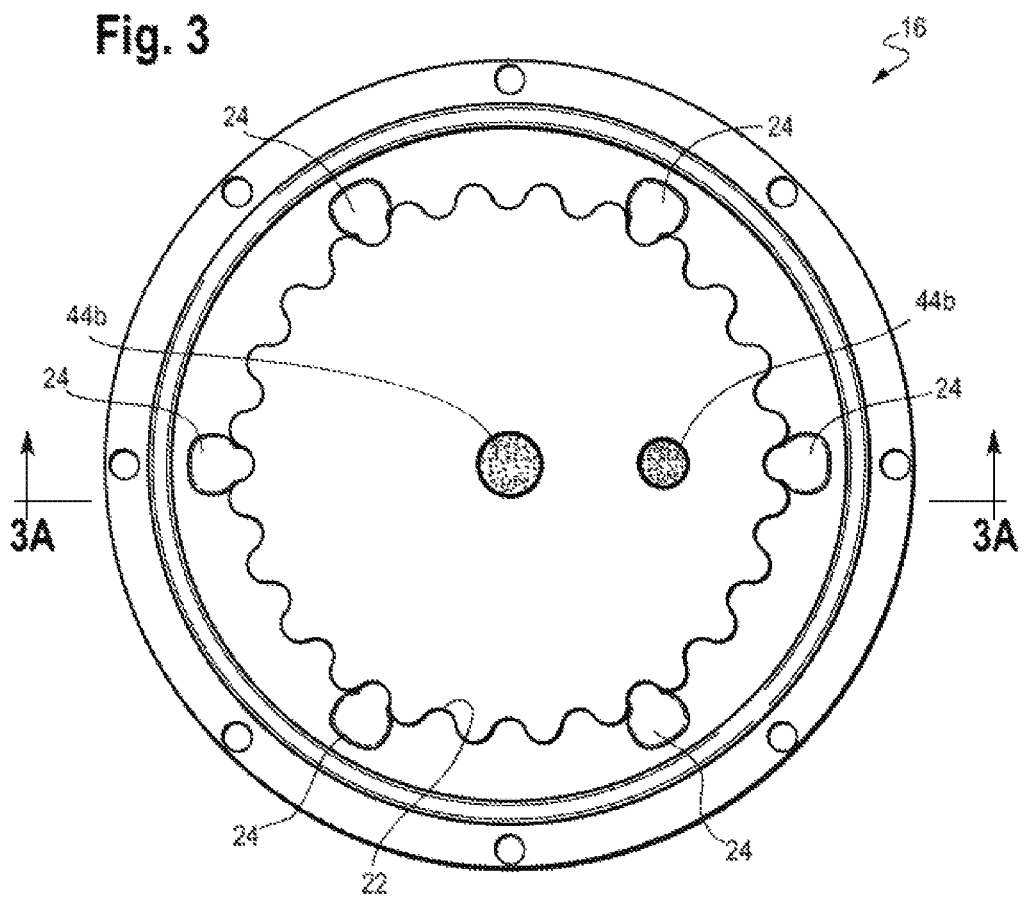
FIG. 3 is a plan view of an inner surface of an endcap in accordance with an embodiment of the present disclosure.
Figure 3A:
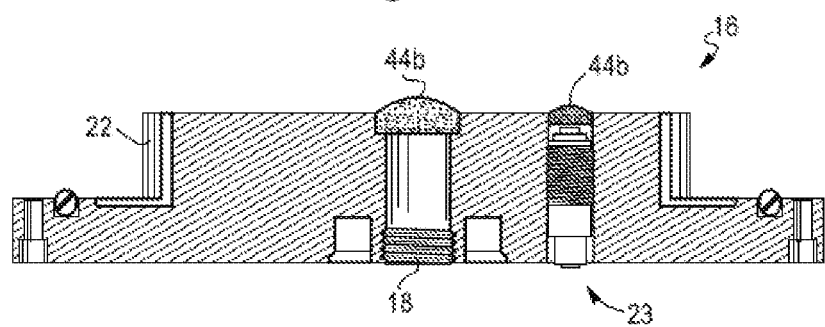
FIG. 3A is a sectional view of the endcap taken along line 3A-3A of FIG. 3.

One or both endcaps can include fluted structure, alone, or in combination with fluted surface 14 of the cylinder 12. In an embodiment, FIGS. 2, 3, and 3A show fluted rim 22 for endcap 16. The structure of the fluted rim 22 may or may not match the structure of the fluted interior surface 14. In an embodiment, the structure of the fluted rim 22 matches the structure of the fluted interior surface 14 of the cylinder 12. In other words, fluted rim 22 is configured to have (i) the same number of flutes, (ii) the same low-point/high-point dimensions, and (iii) the same radius of curvature (when grooves/peaks are curved) as the fluted interior surface 14.

It is understood that endcap 17 may have a similar rim structure. The rim 22 supports the diaphragm within the enclosure 20 as will be described below.

Each endcap includes a plurality of ports. FIGS. 2-3 show ports 24 for endcap 16. It is understood that endcap 17 has similar ports. The ports 24 are arranged in a spaced-apart manner around the perimeter defined by rim 22. The ports permit fluid communication, or gas flow, between the inner chamber and the storage space of device 10 as will be described below.

In an embodiment, each endcap 16, 17 is releasably attachable to the cylinder 12. Attachment members, a non-limiting example of which are bolts 26, releasably attach endcaps 16, 17 to respective opposing ends of the cylinder 12 to form the enclosure 20. Suitable gaskets and/or O-rings are positioned between the cylinder ends and each endcap interior surface to ensure an airtight (i.e., a hydrogen gas tight) seal. When the device 10 is in operation, the enclosure 20 is a closed volume and an airtight volume.

3. Diaphragm

The device includes a diaphragm. The diaphragm is a tubular structure having an annular sidewall and opposing open ends. The sidewall may or may not be fluted. The diaphragm may or may not have a uniform diameter along its length. The diaphragm is made of a flexible and resilient material. Nonlimiting examples of suitable material for the diaphragm include polymeric material and metal. The diaphragm may or may not be permeable to gas, such as hydrogen gas, for example. The diaphragm is located in the enclosure, the sidewall extending the length of the enclosure, and the diaphragm defines an inner chamber and a storage space.

Figure 5:
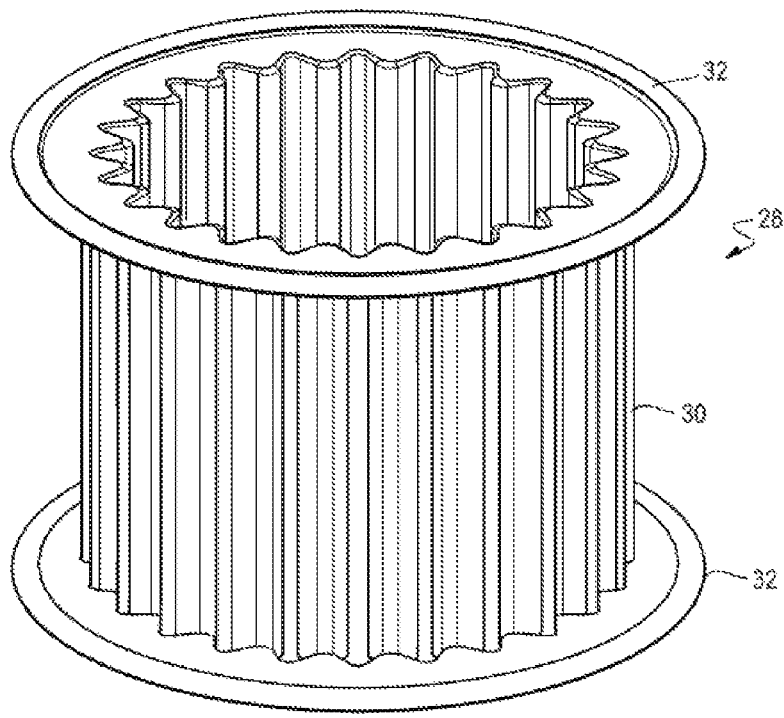
FIG. 5 is a perspective view of a diaphragm in accordance with an embodiment of the present disclosure.

In an embodiment, the device 10 includes a diaphragm 28 with a fluted sidewall 30 and opposing open ends as shown in FIGS. 2 and 5. The structure and/or the configuration of the fluted sidewall 30 may the same as, or different than, the structure or configuration of the fluted interior surface 14 and/or the structure/configuration of the fluted rim 22. In an further embodiment, the structure of the fluted sidewall 30 matches the structure of the fluted interior surface 14 and the structure of the fluted rim 22. In other words, fluted sidewall 30 is configured to have (i) the same number of flutes, (ii) the same low-point/high-point dimensions, and (iii) the same radius of curvature (when grooves/peaks are curved) as the fluted interior surface 14 and the fluted rim 22.

In an embodiment, diaphragm 28 is composed of a flexible polymeric material resistant to degradation (i.e., resistant to hydrogen embrittlement and/or resistant to metal hydride abrasion) and is impermeable to hydrogen gas and is impermeable to water. Nonlimiting examples of suitable flexible polymeric material for the diaphragm include polypropylene (including polypropylene plastomer), polyethylene (including high density polyethylene, low density polyethylene, linear low density polyethylene, and polyethylene elastomer), polyvinyl chloride, polycarbonate/acrylonitrile butadiene styrene blend (PC/ABS), polylactic acid, natural rubber, synthetic rubber, polyphenylsulfone, and combinations thereof.

In an embodiment, the diaphragm 28 is composed of a polyethylene elastomer with a Shore A hardness from 70, or 80 to 90.

Referring to FIGS. 2 and 7, the diaphragm 28 is located in the enclosure 20. In an embodiment, the diaphragm 28 has a uniform diameter along its length. The diaphragm 28 extends along the length of the enclosure 20. At each open end of the diaphragm is a flange 32. Each flange 32 extends radially outward to cover, or otherwise overlap, a portion of a respective cylinder end. The diaphragm 28 defines an inner chamber 34 and a storage space 36. More specifically, FIG. 7 shows the inner surface of the fluted sidewall 30, along with the inner surfaces of the endcaps 16, 17 define the inner chamber 34. The outer surface of the fluted sidewall 30 and the fluted interior surface 14 of the cylinder 12 (along with a portion of each endcap inner surface) define the storage space 36.

In an embodiment, the enclosure has a diameter of length A and the diaphragm has a diameter (unflexed) of length B as shown in FIG. 7. The length of diameter B (in centimeters, cm) is from 0.1 times (x), or 0.2×, or 0.3×, or 0.4×, or 0.5× to 0.6×, or 0.7×, or 0.8×, or 0.9×, or 0.95× the length of diameter A (in centimeters, cm).

In an embodiment, the device 10 has the following dimensions, Dimensions A, in the table below.

Dimensions A

| | |
|---|---|
| diameter A (Fig. 7) | 12.8 cm |
| cylinder, outermost diameter | 15.1 cm |
| length (endcap to endcap, outermost surface) | 17.7 cm |

In an embodiment, one, some, or all of the components of Dimensions A can be reduced by an amount from 10%, or 20%, or 40% to 50%, or 60%, or 70%, or 80%, or 90%.

In an embodiment, one, some, or all of the components of Dimensions A can be increased by an amount from 125%, or 150%, or 200%, or 300%, to 400%, or 500%.

4. Storage Space and Metal Hydride Composition

The device includes a metal alloy located in the storage space. The metal alloy is a metal hydride composition. Consequently, the device includes a metal hydride composition located in the storage space. The metal hydride composition contacts the inner surface of the cylinder and also contacts the outer surface of the diaphragm. The direct contact between the metal hydride composition and the cylinder inner surface advantageously contributes to the heat dissipation capability of the device—particularly during hydrogen charge.

The storage space may be partially filled (to allow for expansion of the metal hydrides) or completely filled with the metal hydride composition. The metal hydride typically exhibits and expansion from 5 vol % to 10 vol % upon initial activation. Thus, when the storage space is completely filled with metal hydride composition, the volume of the storage space and the volume of metal hydride composition will be used interchangeably.

In an embodiment, the device 10 includes storage space 36 with metal hydride composition 37 located therein as shown in FIGS. 2 and 7. The storage space 36 is a closed volume and provides a donut-shaped cross-section shape for the metal hydride composition as shown in FIG. 2.

In an embodiment, the device 10 includes one, some, or all of the following features (unflexed diaphragm):
  (i) a storage space-to-enclosure volume ratio (in cubic centimeters, cc) from 0.3, or 0.4, or 0.5 to 0.6, or 0.7, or 0.8; and/or
  (ii) a storage space-to-inner chamber volume ratio (in cc) from 0.5, or 0.6, or 0.7, or 0.8 to 0.9, or 1.0; and/or
  (iii) an inner chamber-to-enclosure volume ratio (in cc) from 0.5, or 0.6 to 0.7, or 0.8; and/or
  (iv) a storage space surface area (cm$^2$)-to-storage space volume (cc) ratio from 0.4, or 0.5 to 0.6, or 0.7, or 0.8.

The form of the metal hydride composition 37 is a granular powder. The metal hydride composition is a porous material. The metal hydride composition may or may not include a binding agent. In an embodiment, the metal hydride composition has a D50 particle size from 1.0 microns, or 1.5 microns, or 2.0 microns to 2.5 microns, or 3.0 microns, or 4.0 microns, or 5.0 microns. The term "D50," as used herein, is the median particle diameter such that 50% of the sample weight is above the stated particle diameter.

In an embodiment, the metal hydride composition has a D50 particle size from 1.5 microns to 2.0 microns.

Alternatively, the metal hydride composition is provided in a plurality of discrete packets. The packets are composed of a gas permeable material. The discrete packets are inserted into the storage space 36 to fill the volume of the storage space.

In an embodiment, the metal hydride composition has the Formula (I):

$$AB_{5+X}$$

wherein

"A" is an element selected from the rare earth metals, yttrium, mischmetal or a combination thereof; and "B" is nickel and tin, or nickel and tin and at least a third element selected from the elements of group IV of the periodic table, aluminum, manganese, iron, cobalt, copper, titanium, antimony, or a combination thereof. The value of X is 0, or is greater than 0 and less than or equal to about 2.0.

The term "mischmetal" (abbreviated Mm) is a naturally occurring mixture of rare earth elements (also known as "raw battery alloy"), and therefore its use is more economic than combinations of pure elements. A typical composition of mischmetal is approximately 21 percent La, approximately 57 percent Ce, approximately 15 percent Nd, approximately 7 percent Pr, and approximately 1 percent other. Weight percent is based on total weight of the mischmetal.

5. Gasket

Figure 4:
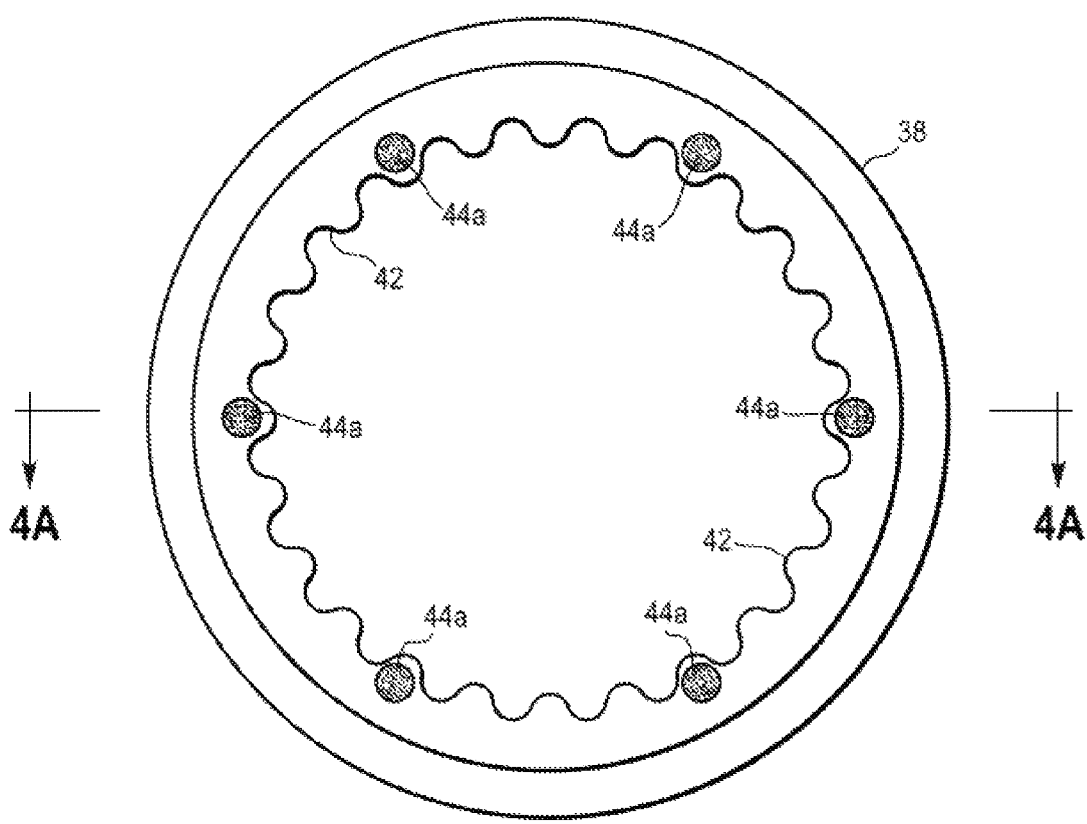
FIG. 4 is a plan view of a gasket in accordance with an embodiment of the present disclosure.
Figure 4A:
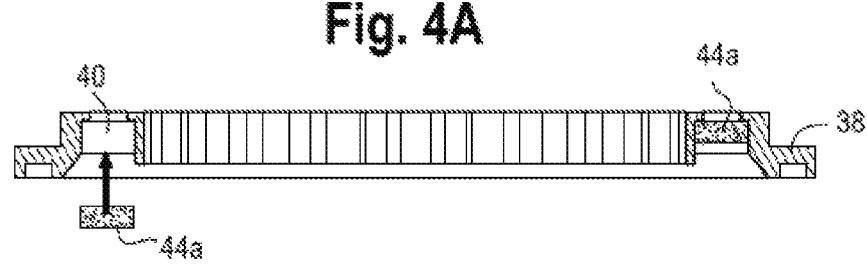
FIG. 4A is sectional view of the gasket taken along line 4A-4A of FIG. 4.

In an embodiment, a gasket 38 is placed on each flange 32 to ensure an airtight seal between the cylinder ends and the endcaps 16, 17, as shown in FIGS. 2, 4, 4A, and 7. Each gasket 38 includes a plurality of open seats 40, each seat 40 configured to hold a respective semi-permeable barrier as shown in FIGS. 2, 4, and 4A. In an embodiment, gasket 38 includes a fluted inner ring 42 that matches, or otherwise mates with, the fluted rim 22 of each respective endcap 16, 17. The seats 40 are arranged in a spaced-apart manner around the perimeter of the fluted inner ring 42. The seats 40 are spaced and configured to align with respective ports 24 of the endcap.

The semi-permeable barrier is composed of a material that is permeable to gas (i.e., hydrogen gas) and impermeable to the metal hydride composition. Nonlimiting examples of suitable material for the semi-permeable barrier include porous ceramic material, fiber, airstone material, fine ceramic/glass bead blend, fine metal filter (1.0, or 1.5, or 2.0, or 3.0 to 4.0, or 5.0 micron pore size), and combinations thereof. In an embodiment, the semi-permeable barrier is a disc 44a of a porous ceramic material. The porous ceramic material is permeable to hydrogen gas and impermeable to the metal hydride composition 37.

In an embodiment, each endcap 16, 17 is subsequently placed on a respective gasket 38. Each endcap 16, 17 is positioned so that each port 24 is aligned with a respective seat/disc 40, 44a. The diaphragm 28 is impermeable to the metal hydride composition 37. Each seat/disc 40, 44a, and port 24 provides fluid communication between the storage space 36 and the inner chamber 34 while simultaneously retaining the metal hydride composition 37 within the storage space 36. Hydrogen gas flows freely between the storage space 36 and the inner chamber 34 vis-à-vis the ports/seat/disc arrangement. The metal hydride composition 37 is blocked from leaving the storage space 36. In this way, the device 10 prevents (vis-à-vis the port/seat/disc configuration), passage of metal hydride particles from the storage space into the inner chamber and simultaneously permits flow of hydrogen between the storage space and the inner chamber.

Placement of each endcap onto its respective cylinder end brings each endcap rim 22 into friction fit with the inner surface of the diaphragm sidewall 30. Securement of the endcaps 16, 17 to the cylinder 12 sandwiches the gasket 38 and sandwiches the flange 32 between the endcap interior and the cylinder end. At the same time, the endcap rim 22 abuts the inner sidewall surface to provide rigid support to the diaphragm ends. In this way, the diaphragm 28 is securely positioned within the enclosure 20 to define, or otherwise to form, two discrete areas (the inner chamber 34 and the storage space 36) within the enclosure 20. Moving from the exterior to the interior of the device, FIG. 7 shows the following configuration: endcap(17)/O-ring(O)/gasket (38)/flange(32)/cylinder end.

In an embodiment, a semi-permeable membrane, such as disc 44b of porous ceramic material is operatively connected to each connector 18, 19 and operatively connected to the pressure release valve 23 as shown in FIGS. 3, 3A, and 7. The disc 44b permits hydrogen flow into/out of the device 10 and prevents metal hydride composition flow from device 10.

Figure 6:
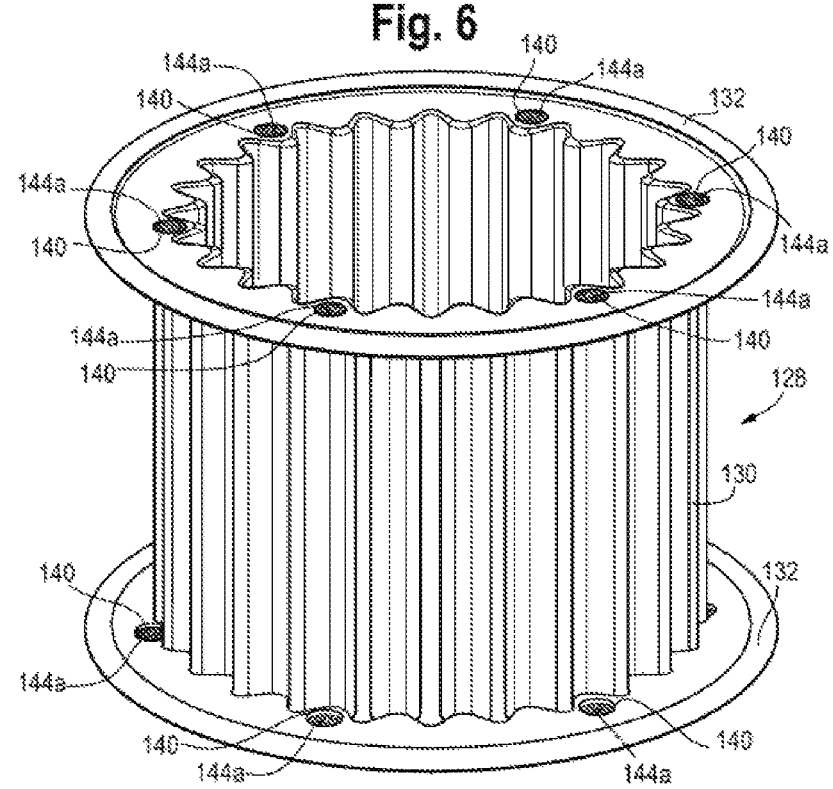
FIG. 6 is a perspective view of another diaphragm in accordance with an embodiment of the present disclosure.

In an embodiment, the device 10 includes diaphragm 128 as shown in FIG. 6. Diaphragm 128 includes fluted sidewall 130 and opposing open ends. The structure of the fluted sidewall 130 may match, or may not match, the structure of the fluted interior surface 14 as discussed above. At each open end of the diaphragm 128 is a flange 132. The flange 132 includes a plurality of open seats 140. Each seat 140 is configured to hold, or otherwise to retain, a semi-permeable barrier, such as disc 144a of porous ceramic material. The diaphragm 130 with discs 144a integrated in the flange may be used as a replacement for, or otherwise may eliminate, the use of gasket 38 in the device 10.

6. Gas Charge

Figure 8B:
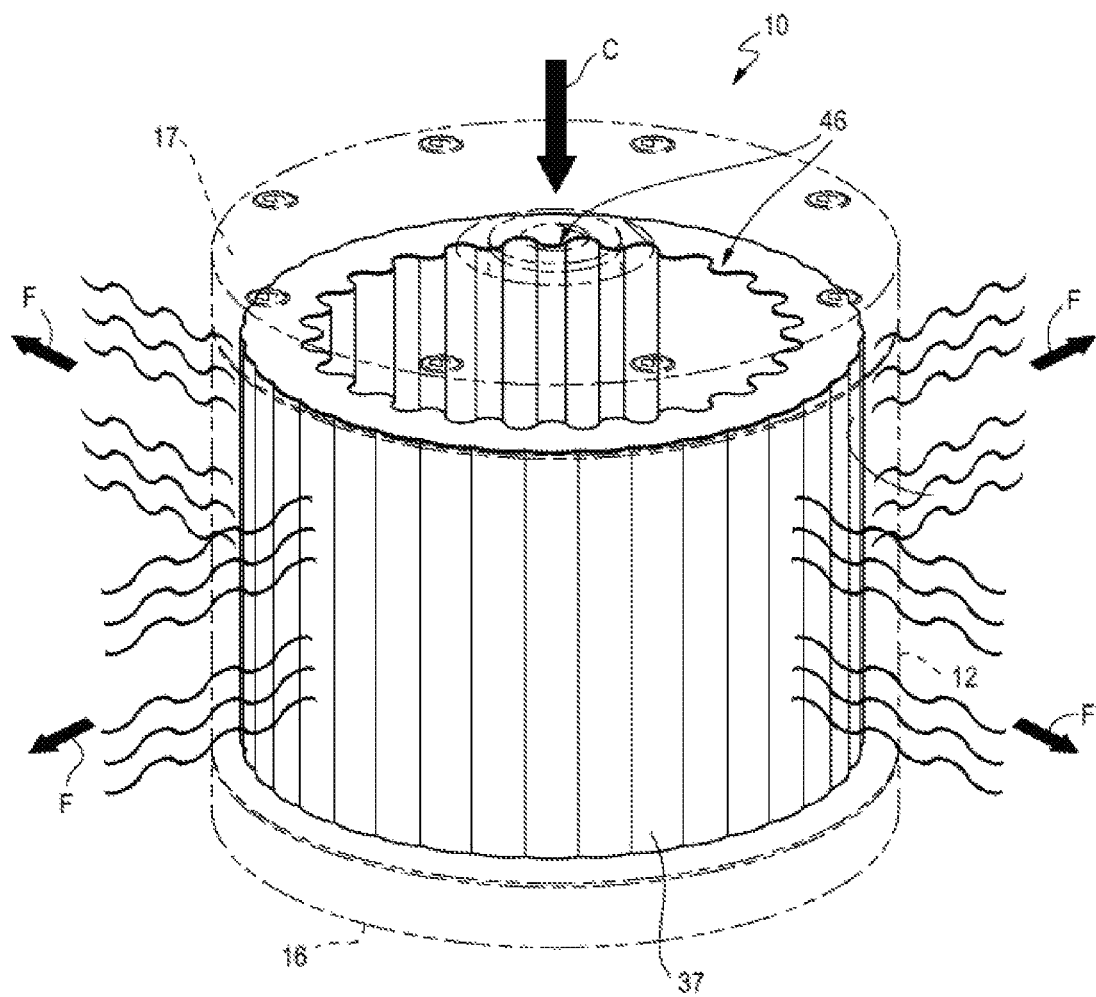
FIG. 8B is another cutaway perspective view of the metal hydride composition during the gas charging procedure of FIG. 8, in accordance with an embodiment of the present disclosure.

FIGS. 8, 8A, and 8B depict gas charging of the device 10. Hydrogen gas introduced through one or both connectors is absorbed and adsorbed by the metal hydride composition. The combined absorption and adsorption of hydrogen atoms by the metal hydride composition is hereafter referred to as "hydrogen capacity." Hydrogen gas under pressure is introduced into the inner chamber by way of a connector, such as male connector 19 shown by arrows C in FIG. 8. The pressurized hydrogen gas flows through the connector and flows through the disc 44b of porous ceramic material (semi-permeable membrane) and into the inner chamber 34. From the inner chamber 34, gas flows through ports 24, through the discs 44a and into the storage space 36.

In an embodiment, hydrogen gas is introduced into the device 10 at a pressure (psi in parentheses) from 55 kPa (8), or 69 kPa (10), or 138 kPa (20), or 172 kPa (25), or 207 kPa (30), or 241 kPa (35), 276 kPa (40), or 345 kPa (50), or 689 kPa (100), or 1388 kPa (200) to 2086 kPa (300), or 2413 kPa (350), or 2758 kPa (400).

In an embodiment, hydrogen gas is introduced into the device 10 at a pressure (psi in parentheses) from 345 kPa (50), or 1387 kPa (200) to 2086 (300), or 2758 (400).

The diaphragm is made from a flexible and resilient material. The diaphragm is able to expand radially inward as the metal hydride composition loads, or otherwise saturates, with hydrogen gas. The diaphragm is flexible, permitting contraction radially outward as hydrogen is discharged from the device.

The metal hydride composition 37 expands volumetrically as hydrogen charging proceeds. The diaphragm is a resilient flexible material permitting flex, or expansion of, the storage space 36 during hydrogen charge. The expansion pressure, shown by arrows D in FIG. 8, imparted by the expanding bed of metal hydride composition 37 impinges upon the fluted sidewall 30 of diaphragm 28, flexing the sidewall inward. Each diaphragm end is securely fastened by way of the "sandwich" configuration between the endcaps and the cylinder ends as previously disclosed. The diaphragm ends are held in place, permitting the fluted sidewall 30 (made of resilient and flexible material) to flex radially inward, and as hydrogen capacity increases, the diaphragm 28 simultaneously maintains a barrier between the storage space 36 and the inner chamber 34.

FIG. 8A shows the hydrogen gas migrating into the metal hydride composition 37 for adsorption/absorption therein. The peaks of the fluted sidewall 30 may mate with, or may be offset with, the peaks of the fluted interior surface 14. In either configuration (mated or offset), the fluted sidewall 30 and the cylinder fluted interior surface 14 form a plurality of parallel columns 46, in the storage space 36. Each column 46 is circular, or substantially circular, in cross-sectional shape. Bounded by no particular theory, Applicant discovered the fluting improves hydrogen gas charging of the device 10. The fluting works synergistically to form a series of parallel, or substantially parallel, cylindrical columns 46 within the storage space 36. The cylindrical cross-sectional shape of the columns 46 directs, or otherwise guides, the hydrogen gas in a helical flowpath E, in FIG. 8A.

In an embodiment, the diaphragm 28 is installed into the enclosure 20 so that the grooves and peaks of the fluted sidewall 30 mate, or otherwise align with, the respective grooves and peaks of the fluted interior surface 14 to form columns 46.

The fluting increases surface area contact between the gas and the metal hydride composition and simultaneously helically percolates the gas increasing contact time and increasing surface area contact. This advantageously increases hydrogen adsorption and absorption onto/into the individual particles of the metal hydride composition. In particular, the helical flowpath E enables the hydrogen gas to gradually percolate through particle bed of the metal hydride composition 37. The helical flowpath E (i) keeps the metal hydride particles in motion to decrease hydrogen adsorption/absorption time, (ii) prevents clumping or agglomeration of the metal hydride composition, (iii) increases the distance each hydrogen molecule travels through the particle bed of metal hydride composition 37, (iv) improves the mobility of the hydrogen molecules through the metal hydride composition, and (v) a combination of (i), (ii), (iii), and (iv). The configuration of each column 46 also increases the contact volume interface between a given hydrogen molecule and the particles of metal hydride composition. Applicant discovered that the fluting (fluted interior surface 14 and fluted sidewall 30) leads to (vi) a faster rate of hydrogen adsorption/absorption, (vii) an increase in hydrogen adsorption/absorption volume, (viii) increased surface area for improved cooling during gas charging, and (ix) increased surface area for improved heating during gas discharge.

In an embodiment, the device 10 has a hydrogen capacity from 60 grams per liter (g/L), or 70 g/L, or 80 g/L, or 90 g/L, or 100 g/L, or 130 g/L, or 150 g/L, or 170 g/L, or 190 g/L to 200 g/L, or 230 g/L, or 250 g/L.

Hydrogen charging of the metal hydride composition is an exothermic reaction. The heat generated from the charging is dissipated through the cylinder 12 as shown by arrows F of FIG. 8B. Applicant discovered that placement of the metal hydride composition in direct contact with the fluted interior surface promotes heat dissipation through the cylinder. Bounded by no particular theory, it is believed that the fluted interior surface 14 of the cylinder 12 increases the surface area thereby increasing the heat dissipation capacity of the cylinder. In this way, the present device 10 avoids, or otherwise eliminates, the need for a coolant system because the cylinder body itself functions as a heat exchanger. Thus, in an embodiment, the present device 10 is void of, or is otherwise free of, a coolant system.

The metal hydride composition 37 can store from 2%, or 5%, or 7% to 10%, or 15% or 20% of its own weight in hydrogen at room temperature. By way of example, if the storage space 36 contains 1 kg of metal hydride composition, the metal hydride composition can contain from 20 g to 200 g of hydrogen.

7. Vibration Device

The process of charging the device 10 with gas may also include one, some, or all of the following techniques: vibrational loading of hydrogen gas into the device, and/or percussive loading of hydrogen gas into the device.

In an embodiment, pressurized hydrogen gas is introduced into the device 10. The hydrogen gas is introduced through connector 18 and/or connector 19 into the enclosure 20 at a pressure (psi in parentheses) from 55 kPa (8), or 69 kPa (10), or 138 kPa (20), or 172 kPa (25), or 207 kPa (30), or 241 kPa (35), 276 kPa (40), or 345 kPa (50), or 689 kPa (100), or 1388 kPa (200) to 2086 kPa (3000, or 2413 kPa (350), or 2758 kPa (400).

In an embodiment, a vibration device imparts a vibrational force to the pressurized hydrogen gas and to the metal hydride composition during gas charging. A "vibration device," as used herein, is a device that provides periodic back-and-forth, or oscillating motion, to a structure. Nonlimiting examples of suitable vibration devices include solenoid, microdrive, vibration motor, linear resonant actuator, piezoelectric drive, vibration platform, and any combination thereof. Bounded by no particular theory, Applicant discovered that applying a vibration force upon the device 10 during gas charging improves and promotes the hydrogen capacity of the metal hydride composition. Resonation of the metal hydride composition by way of percussive force and/or vibrational force yields a super-saturation of hydrogen solubility in the metal hydride composition, and in nickel/tin-based metal hydride compositions in particular.

Figure 3B:
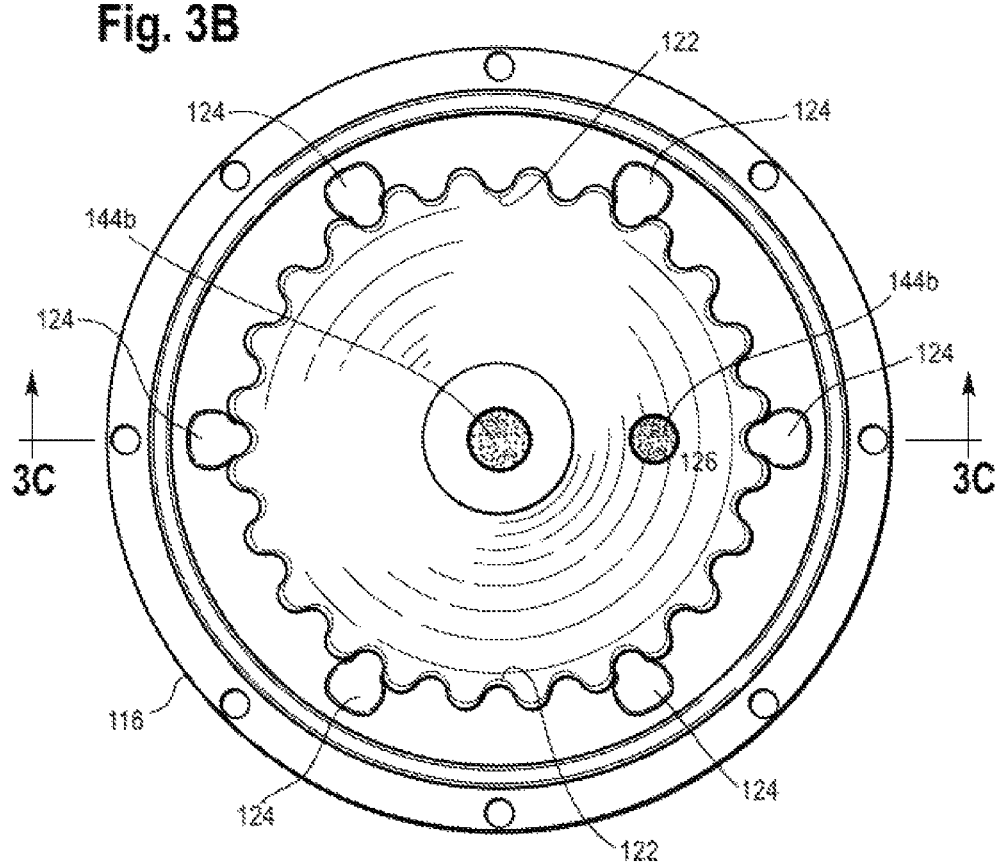
FIG. 3B is a plan view of an inner surface of an endcap in accordance with an embodiment of the present disclosure.
Figure 3C:
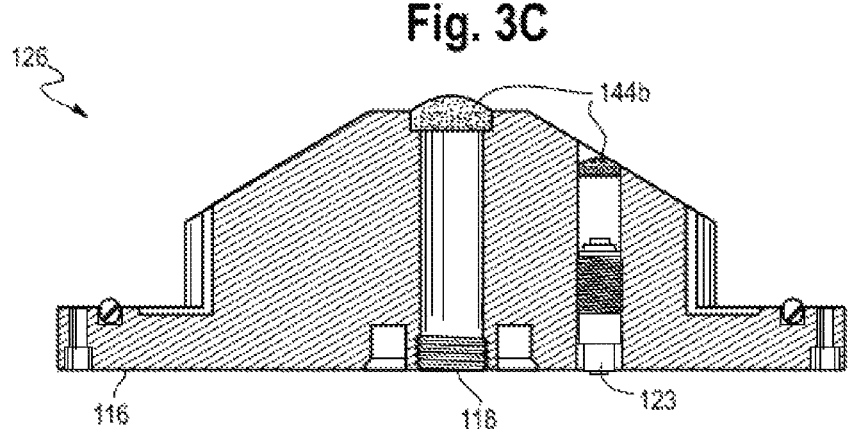
FIG. 3C is a sectional view of the endcap taken along line 3C-3C of FIG. 3B.
Figure 3D:
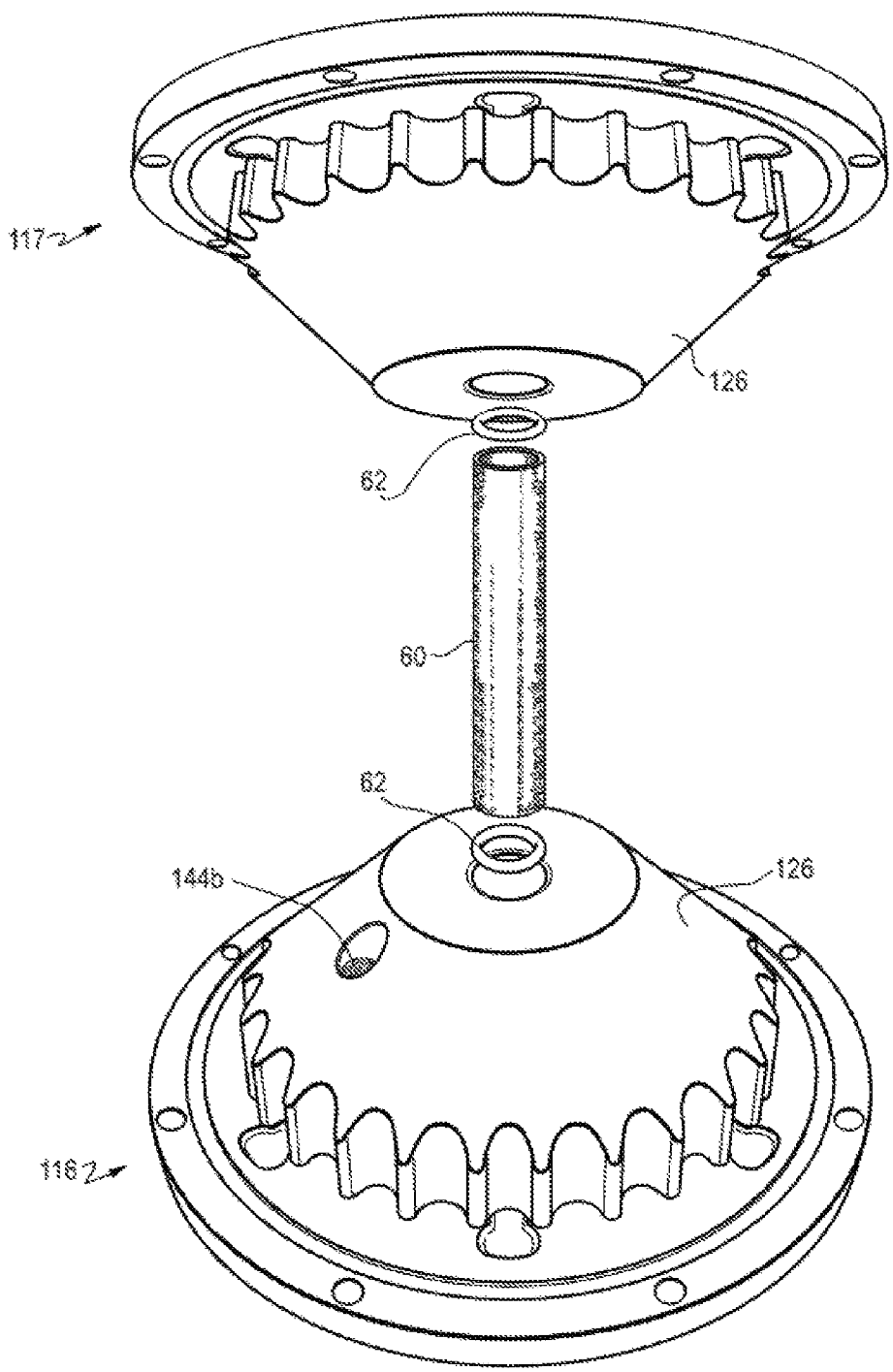
FIG. 3D is an exploded perspective view of two endcaps and a tubular filter in accordance with an embodiment of the present disclosure.

In an embodiment, the vibration device is an internal component of the device 10. The device 10 includes an endcap 116 as shown in FIGS. 3B and 3C. Endcap 116 includes a connector, 118 (with disc 144b of porous ceramic material), a rim 122, and ports 124 as previously disclosed. The endcap 116 includes a structure 126 configured to house a vibration device, such as a solenoid, for example. The vibration device imparts a vibrational force and/or a percussive force on the hydrogen gas and the metal hydride composition during gas charging. In a further embodiment, the vibration device frequency is adjusted to vibrate at the resonance frequency of the metal hydride composition. Although FIGS. 3B and 3C depict endcap 116, it is understood that the device 10 may include another endcap 117 (not shown) with structure to house a vibration device.

In an embodiment, the vibration device is a component that is external to the device 10. The vibration device can be coupled to, or otherwise operatively connected to, the exterior of the device 10. The vibration device imparts a vibrational force and/or a percussive force upon the hydrogen gas and the metal hydride composition as described above. A nonlimiting example of an exterior vibration device is a vibration platform (not shown) upon which the device 10 is placed during the introduction of the pressurized hydrogen gas into the device.

Regardless whether the vibration device is internal or external to the device 10, the vibrational and/or the percussive force during hydrogen charging imparts a resonation of the metal hydride composition which expands the interstitial spaces of the metal hydride lattice structure to super-saturate hydrogen solubility within the metal hydride composition.

The charged device 10 provides one, some, or all of the following properties:
(i) solid-storage hydrogen storage that is non-explosive; and/or
(ii) completely reversible system (charge/discharge); and/or
(iii) no memory effect, dischargeable at 100% where power retrieval and energy storage are uncoupled: and/or
(iv) years of maintenance-free operation; and/or
(v) no loss of hydrogen capacity; and/or
(vi) an internal pressure (psi in parentheses) from greater than 0 (>0), or 34 kPa (5), or 207 kPa (30), or 276 kPa (40), or 345 kPa (50), or 689 kPa (100) to 1388 kPa (200), or 2086 kPa (300), or 2758 kPa (400).

8. Gas Discharge

Figure 9:
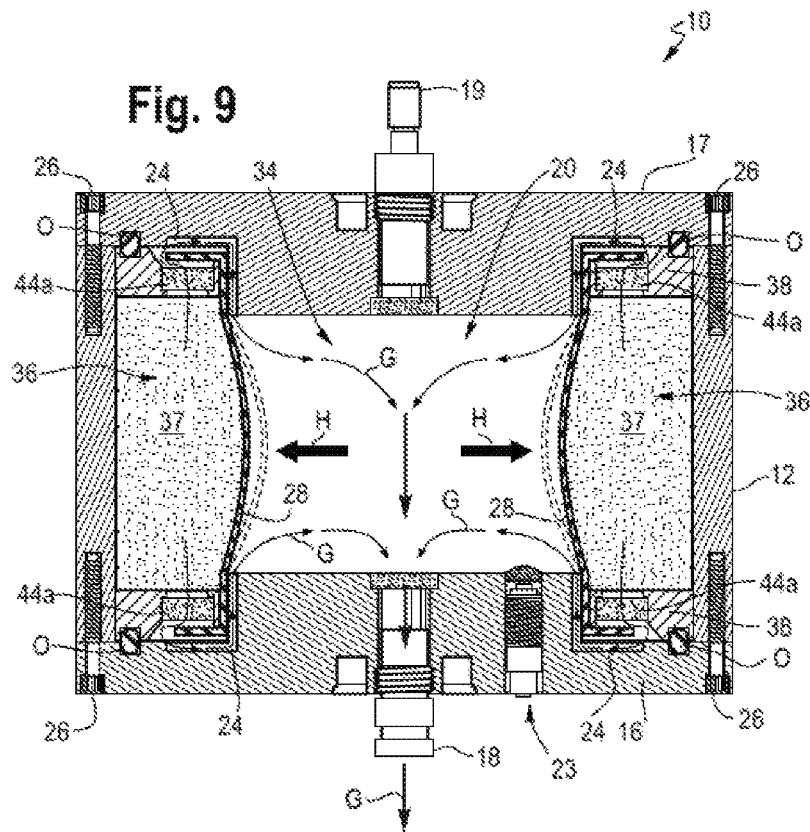
FIG. 9 is a sectional view of the storage device of FIG. 7 during a gas discharging procedure in accordance with an embodiment of the present disclosure.
Figure 9A:
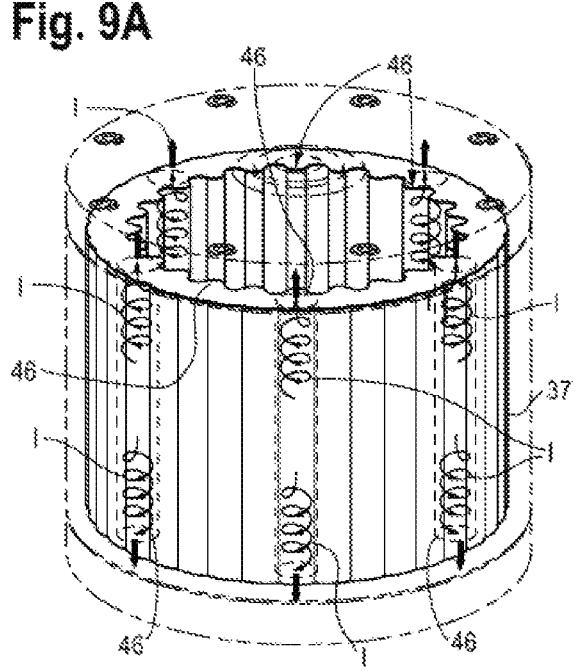
FIG. 9A is a cutaway perspective view of the metal hydride composition during the gas discharging procedure of FIG. 9, in accordance with an embodiment of the present disclosure.

Once charged, device 10 is ready to deliver hydrogen gas. One or both connectors can be connected to a gas outlet. Referring to FIGS. 9, 9A, and 9B, connector 18 is connected to a gas outlet. It is understood that connector 19 can be connected to a gas outlet in a similar manner. When the gas outlet is opened, hydrogen gas, shown by outward flow of gas, arrows G, flows from storage chamber 36, through discs 44a, through ports 24, through the inner chamber 34 through connector 18, and out of the device 10. When the gas outlet is opened, the flexed sidewall of the diaphragm 28 contracts (outward) towards its rest position and impinges upon the bed of metal hydride composition 37, as shown by arrows H. The force imparted by the contracting sidewall of the diaphragm 28 continues the pressurized flow of hydrogen gas from the metal hydride composition 37, through discs 44a, through ports 24, into the inner chamber 34, and out of connector 18.

Bounded by no particular theory, it is believed that the reciprocating fluting structure between the fluted interior surface 14 and the fluted sidewall 30 and resultant columns 46 cause the hydrogen gas to exit the metal hydride composition 37 in a helical flowpath I as shown in FIG. 9A. The helical flowpath I of the hydrogen molecules promote full dissociation of hydrogen from the lattice structure of the metal hydride composition. The helical flowpath I keeps the particles of the metal hydride composition motile and free from clumping/agglomeration. The increased surface area provided by the fluted structures (cylinder interior surface, diaphragm sidewall, endcaps) promotes desorption by enabling the device 10 to transfer ambient external heat into the cylinder interior.

Hydrogen discharge from the device 10 is an endothermic reaction. The body of the cylinder 12 functions as a heat exchanger to transfer heat from the ambient environment into the enclosure 20 as shown by arrows J in FIG. 9B. In an embodiment, the metal hydride composition has a endothermic hydrogen release enthalpy in the range from 20-30 kilo joules (kj)/(mol $H_2$).

The diaphragm has several functions. First, the diaphragm 28 is a barrier between the storage space 36 and the inner chamber 34. The diaphragm 28 prevents metal hydride composition 37 in the storage space 36 from entering the inner chamber 34. Second, the diaphragm contributes to hydrogen loading. As the metal hydride composition becomes saturated, or super-saturated, with hydrogen molecules, the volume of the metal hydride composition increases flexing the fluted sidewall 30 radially inward. Third, the diaphragm contributes to hydrogen discharge. As previously, mentioned, the diaphragm imparts a positive pressure on the saturated metal hydride composition 37 in the storage space 36.

Figure 3E:
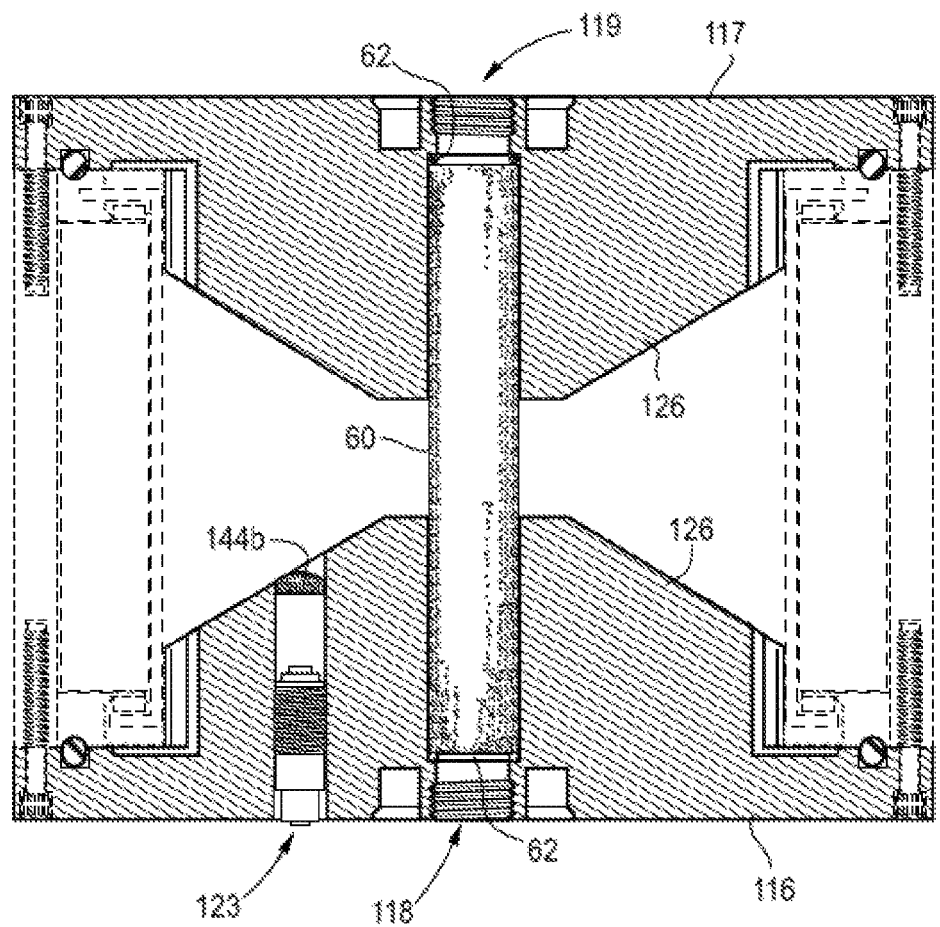
FIG. 3E is a sectional view of the endcaps and tubular filter of FIG. 3D.

In an embodiment, a semi-permeable material extends through the enclosure of the device and between the connectors. The semi-permeable material may be any semi-permeable material disclosed above that permits hydrogen flow while preventing flow of the particles of the metal hydride composition. FIG. 3C shows an exploded view of endcap 116 and endcap 117, each endcap 116,117 having structure 126. Structure 126 is capable of being configured to house a vibration device, as disclosed above. A tubular filter 60 extends through the structure 126 of each endcap 116, 117. The tubular filter 60 is composed of a semi-permeable material such as a metal filter material having a pore size from 1 micron to 2 microns. The tubular filter 60 is permeable to hydrogen gas and impermeable to the metal hydride particles. O-rings 62 are located at each end of the tubular filter 60 to provide an airtight seal between the tubular filter 60 and each endcap 116, 117. The O-rings 62 compressively hold the tubular filter 60 in place when the endcaps 116, 117 are secured to the cylinder 12. As shown in FIG. 3E, the tubular structure 60 extends from connector 119 through endcap 117, through endcap 116, and to connector 118. Tubular filter 60 prevents egress of metal hydride particles from the device 10. Endcap 116 includes pressure release valve 123 and disc 144b of ceramic material. It is understood that tubular filter 60 can be used with other endcap structures, such as endcaps without structure 126, as shown in FIG. 10A.

9. Interconnect

Referring to FIGS. 10 and 10A, two or more devices 10 may be interconnected. Interconnection may occur during (i) gas charge, (ii) gas discharge, and (iii) both (i) and (ii). In an embodiment, female connector 18 of device 10b is attached to male connector 19 connector of device 10a in male-female connection, placing the enclosure 20 of the device 10b into fluid communication with the enclosure 20 of device 10a.

Although FIGS. 10, 10A show two devices connected together, its understood that 2, or 3, or 4, or 5, or 6, or 7, or 8, or 9, or 10, or 50, or 100, or 1000 devices or more may be interconnected.

FIGS. 10, 10A show the devices interconnected in series. A single line of interconnected devices ("in series" interconnect, as shown in FIGS. 10A and 10B) increases the run time of the devices but does not increase the hydrogen flow rate. Interconnected devices 10a and 10b advantageously increase the hydrogen run time compared to the device 10a or device 10b alone.

The devices may also be interconnected in parallel. Multiple devices that are interconnected "in parallel" increases the hydrogen flow rate, and provides the ability to deliver more hydrogen per minute (liters $H_2$/min).

The devices may also be interconnected both in series and in parallel. Multiple lines (in series interconnect of devices) are interconnected in parallel to (i) increase the hydrogen delivery run time and (ii) also to increase the hydrogen flow rate.

In an embodiment, a manifold 200 supports the interconnected devices 10a/10b and provides a platform and structure for delivering hydrogen gas from 1, or 2, or more devices. The manifold 200 includes tubing 202 for connecting to a connector of a gas storage device to a control unit 210. The control unit 210 includes suitable flow regulators and valves to deliver the hydrogen at pressure suitable for the end application. In an embodiment, the control unit 210 includes a fuel cell to convert the hydrogen gas into electricity and power an electrical load, represented by light 212.

The size and capacity of the present gas storage device may be scaled for the target application. FIG. 10B shows interconnected devices 300a, 300b, 300c, 300d. The devices 300a-d are constructed at a volume to provide hydrogen gas for conversion into electricity energy with sufficient kilowatt/hours (kW/h) for powering the electrical load of a dwelling such as building 302, of FIG. 10B. As such, the present gas storage device may be configured in a modular manner.

The present device 10 may also be scaled to a smaller volume suitable to power consumer electronic devices such as computers, cameras, and the like. The cooling effect (endothermic reaction) that occurs during hydrogen discharge of the device 10 may be used to cool other components of the consumer electronic device by placing the device 10 proximate to components that generate heat.

10. Hydrogen Charging Station

In an embodiment, the present gas storage device is a component of a hydrogen charging station as shown in FIG. 11. A "hydrogen charging station," is an assembly that stores hydrogen, and enables delivery of the hydrogen for filling hydrogen powered vehicles. A hydrogen charging station can be located along a road (similar to, or as part of, a conventional gas station), (ii) at an industrial site, and (iii) a combination of (i) and (ii). A "hydrogen powered vehicle" is a vehicle that uses hydrogen gas as an energy source. Hydrogen gas as an energy source in a vehicle can be in the form of (i) the combustion of hydrogen gas in an combustion engine or the like, (ii) conversion of hydrogen gas into electricity by way of a fuel cell (also known as a "hydrogen fuel cell vehicle"), and (iii) a combination of (i) and (ii). Nonlimiting examples of vehicles that can be powered by hydrogen, and thus can be a hydrogen powered vehicle include cars, trucks, motorcycles, scooters, forklifts, wheelchairs, trains, aircraft, boats, drones, helicopters, rockets, missiles, spacecraft, ships, submarines, torpedoes, and any combination thereof.

In an embodiment, a hydrogen charging station 400 is provided and includes a high pressure tank 402, a pressure converter unit 404, and one or more gas storage devices 410. The gas storage devices 410 may be any gas storage device as previously disclosed herein. The gas storage devices 410 are interconnected as previously disclosed above. In an embodiment, the gas storage devices 410 are interconnected both in series and in parallel as shown in FIG. 11. Piping 412 places the gas storage devices 410 in fluid communication with the converter unit 404. Piping 412 also places the converter unit 404 in fluid communication with high pressure tank 402.

The hydrogen gas is stored in the gas storage devices 410 at low pressure. "Low pressure" is from 34 kPa (5 psi) to 2758 kPa (400 psi). Upon activation, the pressure converter unit 404 draws low pressure hydrogen from the gas storage devices 410, and pressurizes, or otherwise converts the low pressure hydrogen to high pressure hydrogen. "High pressure" is from 55,159 kPa (8,000 psi) to 110,316 kPa (16,000 psi). Nonlimiting examples of suitable technologies for the pressure converter unit 404 includes a turbo inflator, a Venturi tube device, a procharger, and any combination thereof.

The pressure converter unit 404 delivers the high pressure hydrogen to the high pressure tank 402. Once filled with high pressure hydrogen, a hose 414 is used to fill a hydrogen powered vehicle, such as hydrogen powered car 416 as shown in FIG. 11. The hose 414 delivers high pressure hydrogen to the vehicle high pressure tank 418.

In an embodiment, the pressure converter unit 404 draws low pressure hydrogen from the gas storage devices 410 and rapidly converts the low pressure hydrogen to high pressure hydrogen. The devices 410 interconnected in series and in parallel provide a large amount of hydrogen gas to pressure converter unit 404 for rapid conversion to high pressure hydrogen. The pressure converter unit 404 converts and delivers high pressure hydrogen to the high pressure tank 402 in a duration from 10 seconds, or 20 seconds, or 30 seconds to 60 seconds, or 120 seconds, or 240 seconds, or 360 seconds, 480 seconds, or 600 seconds.

One, some, or all of the components of the hydrogen charge station 400 may be above ground or may be underground. In an embodiment, the high pressure tank 402 is above ground and the pressure converter unit 404 and the gas storage devices 410 are underground. The gas storage devices 410 may be charged by way of inlet 420.

Once filling is complete, the hydrogen charge station 400 switches to dwell mode. In dwell mode, any remaining high pressure hydrogen in the high pressure tank 402 is either vented or drawn into the pressure converter unit 404 which re-charges the gas storage devices 410 with the unused high pressure hydrogen. In this way, the high pressure tank 402 holds high pressure hydrogen only during active filling of a hydrogen powered vehicle, thereby reducing the risk of explosion of the high pressure tank 402.

11. Hydrogen Powered Vehicle

The present disclosure provides a hydrogen powered vehicle wherein the present gas storage device provides power to the hydrogen powered vehicle. In other words, the present gas storage device is a component of a vehicle. The vehicle powered by the present gas storage device can be any hydrogen powered vehicle as disclosed above. The power provided to the vehicle by the present gas storage device can be (i) hydrogen combustion, (ii) electrical power (via a hydrogen fuel cell) and (iii) and a combination of (i) and (ii).

In an embodiment, the present gas storage device is used to power a combustion engine 500 as shown in FIG. 12. Suitable tubing 502 connects one or more of the present gas storage devices 510 to the combustion engine 500. The hydrogen gas discharged from gas storage devices 510 is burned directly in the combustion engine 500. Tubing 502 can also deliver the hydrogen gas from the gas storage devices 510 to a fuel cell 504 to generate electricity. The combustion engine can be a piston engine, a gas turbine, a jet engine, a rocket engine, and any combination thereof.

In an embodiment, the combustion engine is a component of a hydrogen powered vehicle, such as a hydrogen powered automobile 550 shown in FIG. 12. One or more devices 510 are interconnected in series and/or in parallel. The devices 510 each has an energy density per unit mass suitable to power the vehicle. This combination of properties makes the present hydrogen gas storage device well-suited for vehicle applications where volume density is a primary concern. When one or more of the devices 510 is depleted, it is exchanged, or otherwise replaced with, a fully charged device 510*a*.

12. Power Pack

The present disclosure provides power pack. In an embodiment, the power pack includes one or more of the present gas storage devices operatively connected to a fuel cell. The power pack also includes connectors (such as wires, for example) to operatively connect the power pack to an electrical load. In this way, the power pack is an electrical generator and can be adapted to power myriad electrical loads.

The size, shape, and power output (i.e., number of gas storage devices) of the power pack can be tailored to accommodate the target application. Nonlimiting examples of electrical loads that can be powered by the power pack include dwellings, buildings, consumer appliances, consumer electronics, lighting units, heating units, vehicles, and any combination thereof.

In an embodiment, the power pack is portable. The power pack can include a housing with a handle, enabling a person to hand-carry the power pack.

In an embodiment, the power pack is rechargable. Replacing or exchanging (or swapping) a power pack's depleted gas storage device(s) with a charged, or fully charged, gas storage devices recharges the power pack and enables the power pack to provide additional electrical power. Exchange of gas storage devices can occur while the power pack is delivering electricity thereby enabling the power pack to provide continuous electrical power.

In an embodiment, the power pack is installed into a vehicle. The vehicle may be a conventional vehicle. Once configured with the power pack the vehicle becomes a hydrogen powered vehicle. The power pack may be the primary power source or the power pack may be an auxiliary power source for the vehicle.

The present power pack finds particular application to the traction market (from forklifts to wheelchairs). The present power pack can be installed in conventional wheelchairs and/or in forklifts to provide primary electric power or auxiliary electric power.

The power pack finds particular application to the electric vehicle market where range anxiety is a concern. In an embodiment, the power pack is installed in an electric car (such as in the trunk, for example) and operatively connected to the electric car's power system. When the main battery of the electric car is depleted or otherwise reaches a pre-determined depletion threshold, the power system switches to the power pack and draws auxiliary electrical power from the fuel cell, the fuel cell fed hydrogen gas from the gas storage device. The power system signals the operator (via dashboard signal, for example) that the vehicle is operating on auxiliary power.

In an embodiment, the power pack provides the electric car with sufficient auxiliary electrical power to travel a distance from 5 kilometers (km), or 10 km, or 20 km, or 30 km or 40 km, to 50 km, or 60 km, or 70 km, or 80 km, or 90 km, or 100 km, or 125, or 150 km. The power pack in the electric car provides emergency or back up electrical power. In this way, the power pack can reduce, or eliminate, range anxiety for operators of electric vehicles by providing auxiliary electric power upon depletion of the vehicle's battery.

Once depleted, the gas storage device(s) are exchanged with charged, or fully charged, gas storage devices.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A gas storage device comprising:
   a cylinder comprising a sidewall and opposing first and second ends, a first endcap at the first end and a second endcap at the second end, wherein the cylinder and the first and second endcaps form an enclosure, and wherein an interior surface of the sidewall is fluted;
   at least one of the first endcap and the second endcap comprising a connector;
   a diaphragm in the enclosure;
   an inner chamber circumscribed by an inner surface of the diaphragm;
   a storage space between the interior surface of the sidewall of the cylinder and an outer surface of the diaphragm; and
   a metal alloy composition located in the storage space.

2. The gas storage device of claim 1, wherein the metal alloy composition stores hydrogen gas.

3. The gas storage device of claim 2, wherein the diaphragm is cylindrical and comprises a diaphragm sidewall.

4. The gas storage device of claim 1, wherein the diaphragm is cylindrical and comprises a diaphragm sidewall, opposing ends, a first flange located at a first end of the diaphragm sidewall, and a second flange located at a second end of the diaphragm sidewall.

5. The gas storage device of claim 4, wherein the diaphragm sidewall is fluted.

6. The gas storage device of claim 5, wherein peaks and grooves of the fluted diaphragm sidewall form cylindrical channels with respective peaks and grooves of the fluted interior surface of the sidewall of the cylinder.

7. The gas storage device of claim 4, wherein the diaphragm is permeable to hydrogen gas.

8. The gas storage device of claim 4, further comprising:
   a first gasket located between the first endcap and the first end of the cylinder, the gasket comprising a plurality of seats, each seat holding a semi-permeable membrane;
   wherein an inner surface of the first endcap comprises a plurality of endcap ports;
   wherein each semi-permeable membrane is aligned with a respective endcap port; and
   wherein the endcap ports and the semi-permeable membranes provide fluid communication between the inner chamber and the storage space.

9. The gas storage device of claim 4, wherein
   an inner surface of the first endcap comprises a plurality of endcap ports;
   wherein the first flange comprises a plurality of seats, each seat holding a semi-permeable membrane;
   wherein each semi-permeable membrane is aligned with a respective endcap port; and
   wherein the endcap ports and the semi-permeable membranes provide fluid communication between the inner chamber and the storage space.

10. The gas storage device of claim 1, further comprising a semi-permeable membrane coupled to the connector of the at least one of the first endcap and the second endcap.

11. The gas storage device of claim 1, further comprising a valve in the connector of the at least one of the first endcap and the second endcap.

12. The gas storage device of claim 1, further comprising a vibration device.

13. The gas storage device of claim 12, wherein the vibration device is one of an actuator, a solenoid, a ram head, a motor, and a piezoelectric material.

14. The gas storage device of claim 1, further comprising:
   a second gas storage device coupled to the gas storage device, the second gas storage device comprising:
      a cylinder comprising a sidewall and opposing first and second ends, a first endcap at the first end and a second endcap at the second end of the cylinder, wherein the cylinder and the first and second endcaps form an enclosure, and wherein an interior surface of the sidewall is fluted;
      at least one of the first endcap and the second endcap of the second gas storage device comprising a second connector, the second connector coupled to the connector of the gas storage device;
      a diaphragm in the enclosure;
      an inner chamber circumscribed by an inner surface of the diaphragm;
      a storage space between the interior surface of the sidewall of the cylinder and an outer surface of the diaphragm; and
      a metal alloy composition located in the storage space.

15. A hydrogen charging station comprising the gas storage device and the second gas storage device of claim 14.

16. A gas storage device comprising:
   a cylinder comprising a sidewall, a first endcap, and a second endcap that form an enclosure, wherein an interior surface of the sidewall comprises grooves;
   at least one of the first endcap and the second endcap comprising a connector;
   a diaphragm in the enclosure;
   an inner chamber circumscribed by an inner surface of the diaphragm;
   a storage space between the interior surface of the sidewall of the cylinder and an outer surface of the diaphragm; and
   a metal alloy composition located in the storage space.

17. The gas storage device of claim 16, wherein the metal alloy composition stores hydrogen gas.

18. The gas storage device of claim 16, wherein the grooves on the interior surface of the sidewall are oriented parallel to a longitudinal axis of the gas storage device.

19. The gas storage device of claim 16, wherein the diaphragm is cylindrical and comprises a diaphragm sidewall.

20. The gas storage device of claim 16, further comprising a vibration device that imparts a vibration when charging the gas storage device with hydrogen.

* * * * *